United States Patent [19]
Yokomachi et al.

[11] Patent Number: 5,870,244
[45] Date of Patent: Feb. 9, 1999

[54] MAGNETIC RECORDING/REPRODUCTION APPARATUS AND METHOD FOR ADJUSTING HEAD HEIGHT THEREIN

[75] Inventors: Yoshiyuki Yokomachi, Tsu; Hiroaki Takeuchi, Tenri; Kazuki Murata, Fukuoka; Tohru Okuda, Nara, all of Japan

[73] Assignee: Sharp Kabushiki Kaisha, Osaka, Japan

[21] Appl. No.: 790,894

[22] Filed: Jan. 29, 1997

Related U.S. Application Data

[63] Continuation of Ser. No. 289,569, Aug. 12, 1994, abandoned.

[30] Foreign Application Priority Data

Aug. 13, 1993 [JP] Japan ...................................... 5-201701

[51] Int. Cl.⁶ ............................ G11B 21/02; G11B 5/584
[52] U.S. Cl. ...................................... 360/77.16; 360/77.15; 360/77.14
[58] Field of Search ............................ 360/77.15, 77.16, 360/77.14, 107, 108, 109, 73.13, 73.04

[56] References Cited

U.S. PATENT DOCUMENTS

| | | | |
|---|---|---|---|
| 4,237,399 | 12/1980 | Sakamoto | 310/317 |
| 4,868,692 | 9/1989 | Nakase et al. | 360/77.16 |
| 4,947,272 | 8/1990 | Yokozawa | 360/77.15 |
| 5,072,319 | 12/1991 | Kohri et al. | 360/77.16 |
| 5,130,875 | 7/1992 | Ono et al. | 360/108 |
| 5,233,488 | 8/1993 | Yanagihara | 360/77.15 |
| 5,241,434 | 8/1993 | Okamoto et al. | 360/78.02 X |
| 5,253,130 | 10/1993 | Kagden et al. | 360/77.15 |
| 5,343,342 | 8/1994 | Kanagawa et al. | 360/77.16 |
| 5,432,658 | 7/1995 | Kajita et al. | 360/77.16 |

FOREIGN PATENT DOCUMENTS

| | | |
|---|---|---|
| 193129 | 9/1986 | European Pat. Off. . |
| 2-521806 | 8/1983 | France . |
| 56-148723 | 11/1981 | Japan . |
| 58-139331 | 8/1983 | Japan . |
| 58-139332 | 8/1983 | Japan . |
| 60-205817 | 10/1985 | Japan . |
| 63-61407 | 3/1988 | Japan . |
| 63-122011 | 5/1988 | Japan . |
| 244514 | 2/1990 | Japan . |

Primary Examiner—Aristotelis M. Psitos
Assistant Examiner—Larry T. Cullen

[57] ABSTRACT

The relative height between two sets of magnetic head groups shared for recording and reproduction and mounted on actuators is adjusted at high accuracy, so that a track of a predetermined track width and track pitch can be formed. In a rotary head type magnetic recording/reproduction apparatus including two sets of magnetic head groups AT and BT of one or a plurality of magnetic heads displaceable in the track width direction by actuators 100A and 100B, a signal which becomes the reference for relative height adjustment of the heads is recorded by one of the magnetic head groups. Then, the magnetic tape is rewound, and the run of the magnetic tape is controlled by one of the magnetic head groups. Under this state, the relative height between the two sets of magnetic head groups is detected by the other magnetic head group, whereby the relative height of the two sets of magnetic head groups is adjusted according to that information.

35 Claims, 34 Drawing Sheets

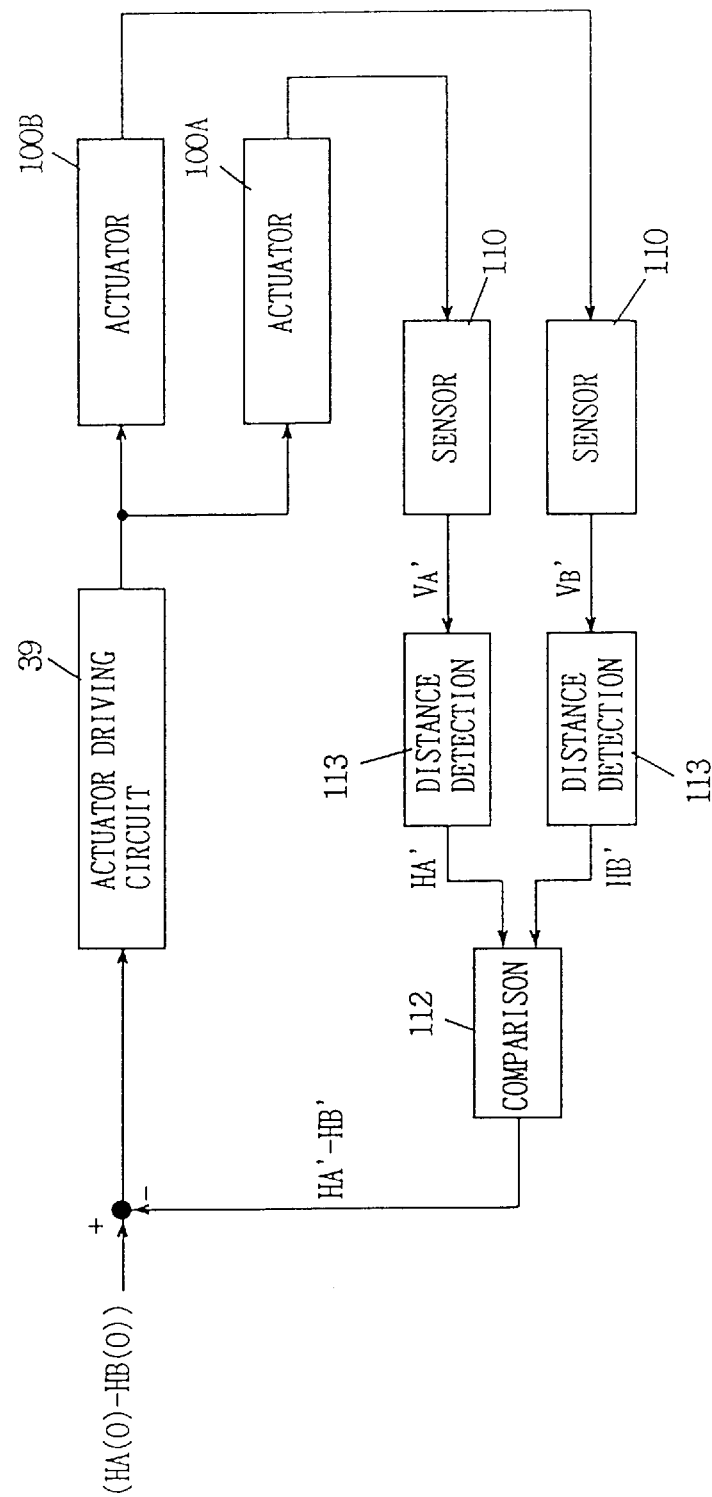
F I G. 3 6

MAGNETIC RECORDING/REPRODUCTION APPARATUS AND METHOD FOR ADJUSTING HEAD HEIGHT THEREIN

This application is a continuation of application Ser. No. 08/289,569 filed on Aug. 12, 1994, now abandoned.

BACKGROUND OF THE INVENTION

1. Field of the Invention

The present invention relates to a method and an apparatus for adjusting the relative height between two sets of magnetic head groups mounted on actuators. More particularly, the present invention relates to a method and an apparatus for adjusting the relative height between two sets of magnetic head groups at the time of recording in a rotary head type magnetic recording/reproduction apparatus such as a helical scan type video tape recorder (VTR).

2. Description of the Background Art

In recent years, there has been efforts to significantly increase the density of recorded information in a magnetic recording/reproduction apparatus, resulting in reduction of the track width. For example, the track width is 5 $\mu$m in a LP mode of a home use digital VTR. Such reduction of the track width causes strict conditions on a magnetic head to carry out a satisfactory tracking operation. More specifically, when a signal is to be reproduced from a track having the width reduced in a conventional type of magnetic recording/reproduction apparatus having the magnetic head fixed to the rotary drum so that the magnetic head cannot move in the direction of the track width, deviation occurs in the tracking of the magnetic head, so that a sufficient reproduced output cannot be obtained from the magnetic head.

This deviation in tracking is considered to be caused by the so-called track bent that occurs during recording. Because this track bent is inherent in each magnetic recording/reproduction apparatus, deviation in tracking caused therefrom becomes too great to be neglected particularly when the relevant track is reproduced by a magnetic recording/reproduction apparatus different from that used for recording.

In view of the foregoing, a magnetic recording/reproduction apparatus is disclosed in, for example, U.S. Pat. No. 4,237,399. According to this magnetic recording/reproduction apparatus including a dynamic tracking system, a magnetic head displaceable in the track width direction by an actuator such as of piezoelectric elements is used. The relative position error of a magnetic head with respect to a track on a magnetic tape is detected on the basis of a signal reproduced from the magnetic head, whereby the position of the magnetic head in the track width direction is controlled by a closed loop according to the detected relative position error.

There are various methods of detecting a relative position error signal of a head with respect to a track on a magnetic tape during reproduction. One typical method is the so-called pilot signal system. According to this pilot signal system, a pilot signal having a different frequency for each track is recorded to be superimposed on a main signal. At the time of reproduction, pilot signal crosstalk components are respectively extracted from tracks located at both sides of a certain track to compare these crosstalk components, whereby the amount of position error of the magnetic head and a polarity representing the direction of deviation of the magnetic head from the track can both be detected.

If a magnetic head is commonly used for recording and reproduction, the cost can be reduced by virtue of the smaller number of heads used and by simplifying the drum structure. However, when a magnetic head is provided on an actuator as described above, the height of the head cannot be determined at the time of recording. For example, when there is deviation in the relative height between the two sets of magnetic heads mounted on separate actuators, a track of a predetermined track width and a predetermined track pitch cannot be formed. As a result, sufficient reproduced output cannot be obtained from a track that has the track width reduced. This becomes more noticeable as the track width (track pitch) becomes smaller.

A method of adjusting the relative height of two sets of magnetic heads mounted on separate actuators is disclosed in, for example, Japanese Patent Laying-Open No. 2-44514.

FIG. 37 is a bottom view of a rotary drum showing the head arrangement of such a conventional magnetic recording/reproduction apparatus employing this head height adjusting method. Referring to FIG. 37, magnetic heads 200A and 200B are installed on actuators 201A and 201B, respectively, that are displaceable in the track width direction. FIG. 38 is a schematic diagram for describing the principle of a conventional method of adjusting the head height. A conventional method of adjusting the height of a head will be described hereinafter with reference to FIGS. 37 and 38.

First, a magnetic tape 202 is set to a running stop state. In this state, a record track 200a is formed on magnetic tape 202 at the first half of a scanning operation by magnetic head 200A. Then, a same record track 200a is reproduced at the first half of a scanning operation of the same track on magnetic tape 202 by magnetic head 200B. Here, actuator 201B on which magnetic head 200B is installed is displaced so that magnetic head 200B follows record track 200a. From this amount of displacement, the amount of track deviation, i.e. the amount of deviation of height of magnetic head 200B with respect to magnetic head 200A is obtained. Then, at the latter half of this scanning operation on magnetic tape 202 by magnetic head 200B, a record track 200b is formed. Then, magnetic head 200A scans the same track on magnetic tape 202. At the latter half of this scanning operation, record track 200b is reproduced by magnetic head 200A, and the amount of track deviation, i.e. the amount of deviation of height of magnetic head 200A with respect to magnetic head 200B is obtained in a similar manner.

By obtaining the average of these two height deviation amounts and displacing one magnetic head according to the obtained value, the relative height difference between magnetic heads 200A and 200B becomes zero. Therefore, a track can be formed that has a proper track width and a proper track pitch in recording a signal.

The above-described conventional method of adjusting the head height has the problems set forth in the following. Since detection of the amount of relative height deviation between heads is carried out on the basis of only one track, the detected error is not averaged and sufficient accuracy cannot be obtained.

Furthermore, because the magnetic tape is held in the run stop state, the contact between a magnetic tape and a magnetic head is often unstable. It cannot be identified whether a change in a reproduced output is caused by deviation in the relative height between the heads, or by unstable tape/head contact.

Furthermore, because a magnetic tape is held in the run stop state, the position in the width direction and the longitudinal direction of the magnetic tape is apt to become unstable. This causes a change in the position of a track to be used as a reference, resulting in degradation of the detected accuracy of the amount of relative height deviation between heads.

SUMMARY OF THE INVENTION

An object of the present invention is to detect and adjust deviation in the relative height between heads with high accuracy to form a track having a proper track width and track pitch in recording a signal in a rotary head type magnetic recording/reproduction apparatus using a common recording/reproduction head.

According to an aspect of the present invention, a method of adjusting the relative height between two sets of magnetic head groups in a rotary head type magnetic recording/ reproduction apparatus including a rotary drum, two sets of magnetic head groups each having one or a plurality of magnetic heads, and a pair of actuators provided on the rotary drum for displacing in the track width direction the two sets of magnetic head groups, respectively, the method comprises the steps of: recording cyclically in a predetermined order a plurality of types of predetermined signals differing for each track on a running magnetic tape by at least one magnetic head comprised in either one of the two sets of magnetic head groups to form a plurality of tracks; rewinding the magnetic tape after recording the signals; controlling the run of the magnetic tape so that the signal is reproduced equally from two tracks spaced apart by two times the track pitch in a general signal recording out of the plurality of tracks by at least one magnetic head comprised in one magnetic head group out of the two sets of magnetic head groups; detecting information concerning the relative height between the two sets of magnetic head groups from an output of the signal reproduced by at least one magnetic head comprised in the other magnetic head group out of the two sets magnetic head groups in a height adjusting mode in which the run of the magnetic tape is controlled; and adjusting the relative height between two sets of magnetic head groups according to the detected information.

According to another aspect of the present invention, a method of adjusting the relative height between a pair of magnetic heads in a rotary head type magnetic recording/ reproduction apparatus including a rotary drum, a pair of magnetic heads, and a pair of actuators provided on the rotary drum for displacing in the track width direction the pair of magnetic heads, respectively, the method comprises the steps of: recording cyclically in a predetermined order a plurality of types of predetermined signals differing for each track on a running magnetic tape by one of the pair of magnetic heads to form a plurality of tracks; rewinding the magnetic tape after recording the signals; controlling the run of the magnetic tape so that the signal is reproduced equally from two adjacent tracks with a space therebetween out of the plurality of tracks by the other of the pair of magnetic heads; preparing in advance a plurality of offset signals corresponding to displacement of said actuator and detecting an output level of the signal reproduced from the one magnetic head while sequentially applying said offset signals to one of the pair of actuators corresponding to the one magnetic head to displace the one magnetic head in a height adjusting mode in which the run of said magnetic tape is controlled, detecting an offset signal when the output level of the reproduced signal becomes maximum as information concerning the relative height between the pair of magnetic heads; and adjusting the relative height between the pair of magnetic heads according to the detected information.

According to a further aspect of the present invention, a method of adjusting the relative height between two sets of magnetic head groups in a rotary head type magnetic recording/reproduction apparatus including a rotary drum, two sets of magnetic head groups each having n (n is an integer of at least 2) magnetic heads, and a pair of actuators provided on the rotary drum for displacing in the track width direction the two sets of magnetic head groups, respectively, the method comprises the steps of: setting the number of rotations of the rotary drum to k times (k is an exact divisor of n other than 1) the number of rotations of a general recording and reproduction operation, or setting the running speed of the magnetic tape to 1/k times the running speed in a general recording and reproduction operation, at the time of the relative height adjustment; recording cyclically in a predetermined order a plurality of types of predetermined signals differing for each track on a magnetic tape running at the set number of rotations of the rotary drum or at the set running speed of the magnetic head by at least one magnetic head comprised in either one of the two sets of magnetic head groups to form a plurality of tracks; rewinding the magnetic tape after recording the signals; controlling the run of the magnetic tape so that the signal is reproduced equally from two tracks spaced apart by two times the track pitch in a general signal recording out of the plurality of tracks by at least one magnetic head comprised in one of the magnetic head groups out of the two sets of magnetic head groups; detecting information concerning the relative height between the two sets of magnetic head groups according to the difference in the output level of the signal reproduced from the two tracks spaced apart by two times the track pitch in a general signal recording out of the plurality of tracks by at least one magnetic head comprised in the other magnetic head groups out of the two sets of magnetic head groups, or according to an output level of the signal reproduced from the track scanned by the magnetic head, in a height adjustment mode in which the run of the magnetic tape is controlled; and adjusting the relative height between the two sets of magnetic head groups according to the detected information.

According to still another aspect of the present invention, a method of adjusting the relative height in the rotary head type magnetic recording/reproduction apparatus further including faces-to-be-detected provided at respective ones of the two sets of magnetic head groups, and at least one sensor for detecting the height of the faces-to-be-detected, the method includes the steps of: storing outputs of the sensor of the faces-to-be-detected at completion of the step of adjusting the relative height between the two sets of magnetic head groups; and controlling independently the pair of actuators in a general signal recording operation so that outputs of the sensor detected for respective ones of the faces-to-be-detected coincide with the stored sensor outputs.

According to a still further aspect of the present invention, a method of adjusting the relative height includes the steps of: storing outputs of the sensor for respective ones of the faces-to-be-detected at completion of the step of adjusting the relative height between two sets of magnetic head groups; for respective ones of the faces-to-be-detected, storing outputs of the sensor when the magnetic head group corresponding to the face-to-be-detected is displaced by an integral multiple of the track pitch in a general signal recording from the state of completing adjustment of the relative height; for respective ones of the faces-to-be-detected, calibrating a displacement-output curve of the sensor with the height of the face-to-be-detected at completion of the relative height adjustment as the reference according to the stored sensor outputs; for respective ones of the faces-to-be-detected, converting the sensor outputs detected into a displacement amount with the height of the face-to-be-detected at completion of the relative height adjustment as the reference according to the calibrated displacement-output curve in a general signal recording operation; calculating difference between respective ones of the detected displacement amounts of the faces-to-be-detected as the time dependent deviation of relative height of the two sets of magnetic head groups; and correcting the optimum offset signal applied to at least one of the pair of actuators according to the calculated difference.

According to yet a further aspect of the present invention, the method of adjusting the relative height includes the steps of: storing outputs of the sensor for respective ones of the plurality of faces-to-be-detected at completion of the step of adjusting the relative height between the two sets of magnetic head group, for each magnetic head group; calibrating the displacement-output curve of the sensor for one of the faces-to-be-detected with the height of the one of the faces-to-be-detected at completion of the relative height adjustment as the reference according to the stored sensor outputs, for each magnetic head group; converting the sensor output detected for the one of the faces-to-be-detected into a displacement amount with the height of the one of the faces-to-be-detected at completion of the relative height adjustment as the reference according to the calibrated displacement-output curve in a general signal recording operation, for each magnetic head group; calculating difference between respective ones of the detected displacement amounts for the two sets of magnetic head groups as time dependent deviation of the relative height of the two sets of magnetic head groups; and correcting the optimum offset signal applied to at least one of the pair of actuators according to the calculated difference.

According to yet another aspect of the present invention, the method of adjusting the relative height in the rotary head type magnetic recording/reproduction apparatus including a first reference face provided on a bottom of the rotary drum, and one or a plurality of second reference faces provided on the bottom of the rotary drum with a predetermined distance in height with respect to the first reference face, the relative height adjusting method includes the steps of: detecting outputs of the sensor with respect to the first and second reference faces; calibrating a distance-output curve of the sensor with the height of the first reference face as the reference according to the detected sensor outputs; converting the sensor outputs for the respective ones of the faces-to-be-detected into distances from the first reference face according to the calibrated distance-output curve and calculating difference therebetween; storing the difference in distance at completion of the step of adjusting the relative height between the two sets of magnetic head groups; controlling the pair of actuators so that the difference in distance detected in a general signal recording operation matches the difference in distance at completion of the adjustment step.

According to another aspect of the present invention, a rotary head type magnetic recording/reproduction apparatus that can have the relative height between a pair of magnetic heads adjusted, comprises: a rotary drum; a pair of magnetic heads; a pair of actuators provided on the rotary drum for displacing in the track width direction the pair of magnetic heads; means for recording cyclically at a predetermined order a plurality of types of predetermined signals differing for each track on a running magnetic tape by one of the pair of magnetic heads to form a plurality of tracks; means for rewinding the magnetic tape after recording the signals; means for controlling the run of the magnetic tape so that the signal is equally reproduced from two adjacent tracks with a space therebetween out of the plurality of tracks by the other magnetic head of the pair of magnetic heads; means for preparing in advance a plurality of offset signals corresponding to displacement of the actuator and detecting an output level of the signal reproduced from the one magnetic head while sequentially applying these offset signals to one of said pair of actuators corresponding to the one magnetic head to displace the one magnetic head in a height adjustment mode in which the run of the magnetic tape is controlled; means for detecting an offset signal when the output level of the reproduced signal becomes maximum as information concerning the relative height between the pair of magnetic heads; means for obtaining from the offset signals detected as the information concerning the relative height an optimum offset signal to be applied to at least one of the pair of actuators to adjust the relative height and storing the optimum offset signal; and means for applying the stored optimum offset signal to at least one of the pair of actuators to adjust the relative height between the heads in a general signal recording operation.

According to a further aspect of the present invention, a rotary head type that can have the relative height between two sets of magnetic head groups adjusted comprises: a rotary drum; two sets of magnetic head groups each including n (n is an integer of at least 2) magnetic heads; a pair of actuators provided on the rotary drum for displacing in the track width direction of the two sets of magnetic head groups, respectively; means for setting the number of rotations of the rotary drum to k times (k is an exact divisor other than 1) the number of rotations in a general recording and reproducing operation, or setting the running speed in a magnetic tape to 1/k times the running speed in a general recording and reproducing operation, at the time of the relative height adjustment, means for recording cyclically in a predetermined order a plurality of types of predetermined signals differing for each track on a magnetic tape running at the set number of rotations of the rotary drum or the set running speed of the magnetic tape by at least one magnetic head comprised in either one of the two sets of magnetic head groups to form a plurality of tracks; means for rewinding the magnetic tape after recording the signals; means for controlling the run of the magnetic tape so that the signal is reproduced equally from two tracks spaced apart by two times the track pitch in a general signal recording out of the plurality of tracks by at least one magnetic head comprised in one of the magnetic head group out of the two sets of magnetic head groups; in a height adjustment mode in which the run of the magnetic tape is controlled, means for detecting as information concerning the relative height between the two sets of magnetic head groups an offset signal applied to the actuator corresponding to the other magnetic head group of the two sets of magnetic head groups when the difference in the output level reproduced from two tracks spaced apart by two times the track pitch in a general signal recording out of the plurality of tracks by at least one magnetic head comprised in the other magnetic head group becomes zero or when the output level of the signal reproduced from a track scanned by the magnetic head becomes maximum; means for obtaining from the offset signal detected as the information concerning the relative height an optimum offset signal to be applied to at least one of the pair of actuators for adjusting the relative height, and storing said optimum offset signal; and means for applying the stored optimum offset signal to at least one of the pair of actuators to adjust the relative height between the magnetic head groups in a general signal recording operation.

According to the present invention, information concerning the relative height between two sets of magnetic head groups is detected while running a magnetic tape, whereby the relative height is adjusted. A plurality of tracks are formed which becomes the reference for head height adjustment. The magnetic head group sequentially scans the plurality of tracks to carry out detection and adjustment of the relative height. Therefore, the detection error of the relative height is averaged, and detection error of the relative height can be reduced which was caused by defective abutment between a magnetic tape and the magnetic head, and an stability of the position of the magnetic head. Thus, the relative height of the magnetic head groups can be adjusted at high accuracy.

According to the present invention, a sensor for detecting the height of the faces-to-be-detected of the magnetic groups is provided, and the displacement-output curve of that sensor is calibrated. Therefore, even if the sensor has non linear characteristics, the relative height deviation of the two sets of magnetic head groups can be detected in the general signal recording operation to carry out correction thereof.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 36 is a block diagram of a head height adjusting apparatus according to the eighth embodiment.

DESCRIPTION OF THE PREFERRED EMBODIMENTS

Before describing each embodiment of the present invention, arrangement of magnetic head groups in a rotary drum, an application of the present invention, a drum structure on which actuators are installed, the structure of each magnetic head group, the track pattern formed at a general signal recording operation, and a scanning locus on a magnetic tape by a magnetic head group when the tape running speed or the speed of rotation of the magnetic head group is varied will be described.

Figure 1:
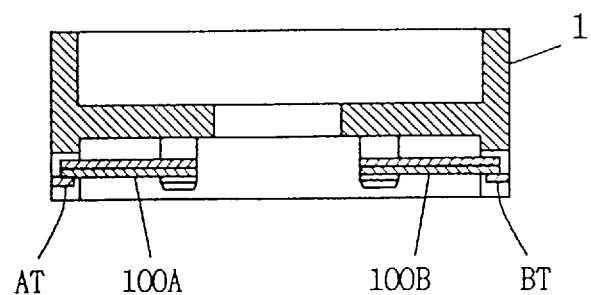
FIG. 1 is a sectional view schematically showing a rotary drum used in the present invention.
Figure 2:
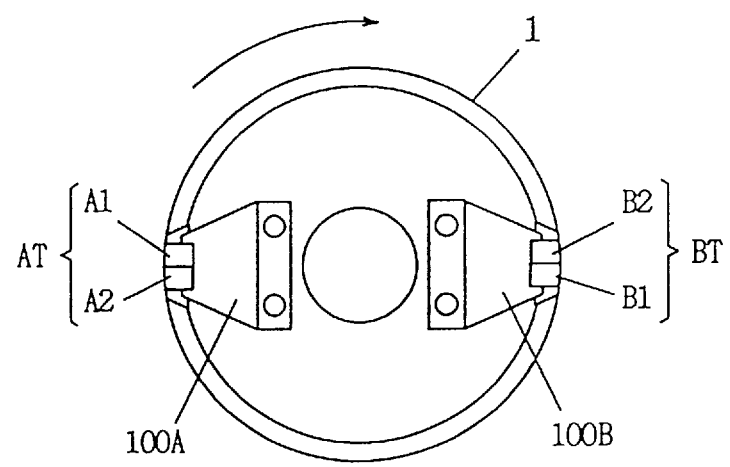
FIG. 2 is a bottom view of a rotary drum used in the present invention.

First, arrangement of magnetic head groups in a rotary drum will be described. FIGS. 1 and 2 are a sectional view and a bottom view, respectively, of a rotary drum 1. Rotary drum 1 rotates in the direction indicated by an arrow in FIG. 2. Magnetic head group AT includes one or a plurality (n) of magnetic heads $A_1, A_2, \ldots, A_n$ and magnetic head group BT includes one or n magnetic heads $B_1, B_2, \ldots, B_n$ ($n \geq 1$), which are mounted on actuators 100A and 100B, respectively. FIG. 2 shows an embodiment where two (n=2) magnetic heads $A_1, A_2$ are included in magnetic head group AT and two magnetic heads $B_1, B_2$ are included in magnetic head group BT.

One application of the present invention will be described hereinafter. Increase in the information recording density in a magnetic recording/reproduction apparatus is particularly noticeable these days. Regarding VTR, the standards for a home use digital VTR (referred to as SD-DVTR hereinafter) and a home use high definition digital VTR (referred to as HD-DVTR hereinafter) are now being determined by "HD-Digital-VCR Conference". To meet the specification of the present conference, the following standards are recommended. For a SD-DVTR, the number of rotations of drum: 9000 rpm; number of heads: 2. For a HD-DVTR, the number of rotations of drum: 9000 rpm; number of heads: 4. In a LP mode (long play mode) of a SD-DVTR and a HD-DVTR, a track pitch of 5 $\mu$m is required. In this case, dynamic tracking technique is mandatory. Therefore, the present invention is applicable to a LP mode of a SD-DVTR, for example, when magnetic head groups AT and BT each include one magnetic head of $A_1$ and $B_1$ (n=1). When magnetic head groups AT and BT each include two magnetic heads $A_1, A_2$ and $B_1, B_2$ (n=2), the present invention is applicable to a LP mode of a HD-DVTR, for example.

A specific structure of a drum apparatus to which actuators 100A and 100B are mounted will be described hereinafter.

Actuators 100A and 100B can include bimorph piezoelectric actuators, electromagnetic moving magnet type actuators, a moving coil type actuators, or the like. Actuators 100A and 100B may be driven independently by independent driving circuits, or may be driven simultaneously by the same driving circuit. When actuators 100A and 100B are driven simultaneously, actuators are employed to be displaced respectively in opposite directions, for example, as shown in FIGS. 42 to 46 which will be described afterwards.

Figure 39:
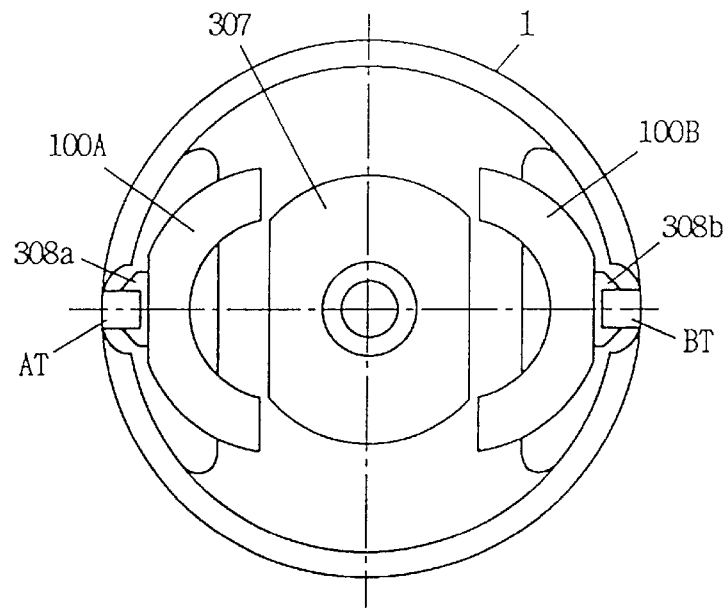
FIG. 39 is a bottom view of a rotary drum used in the present invention.
Figure 40:
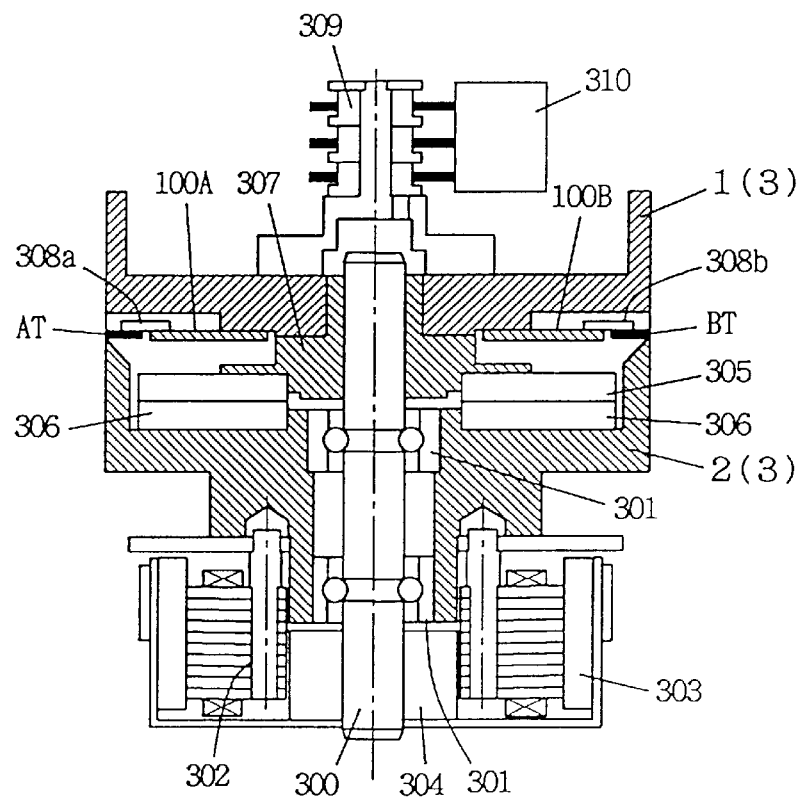
FIG. 40 is a sectional view of a drum apparatus used in the present invention.

A case where bimorph piezoelectric actuators 100A and 100B are installed will be first described. Here, actuators 100A and 100B are driven independently by independent driving circuits. FIG. 39 is a bottom view of rotary drum 1, and FIG. 40 is a sectional view of a drum apparatus 3. Referring to FIG. 39, bimorph piezoelectric actuators 100A and 100B are fixed to rotary drum 1. A head base 308a on which magnetic head group AT is mounted and a head base 308b on which magnetic head group BT is mounted are attached to the tips of actuators 100A and 100B, respectively.

A stator core 306 of a rotary transformer is fixed to a fixed drum 2. A shaft 300 is supported by outer bearings 301 fixed to fixed drum 2. Rotary drum 1 is mounted on a disk 307 fixed to shaft 300 by a pressure fitting. Rotary drum 1 is held in a rotatable manner by fixed drum 2. A rotor core 305 of the rotary transformer is fixed to disk 307. 302 is a stator of the motor fixed to fixed drum 2, and 303 is the rotor of the motor fixed to shaft 300 by means of a collar 304.

According to the above-described structure, rotary drum 1 substantially integral with rotor 303 of the motor is rotated by the rotating driving force of the motor with respect to fixed drum 2 that is substantially integral with stator 302 of the motor. A slip ring 309 fixed to rotary drum 1 is slidably in contact with a brush 310. Brush 310 is fixed to a chassis (not shown) by appropriate means.

Figure 41:
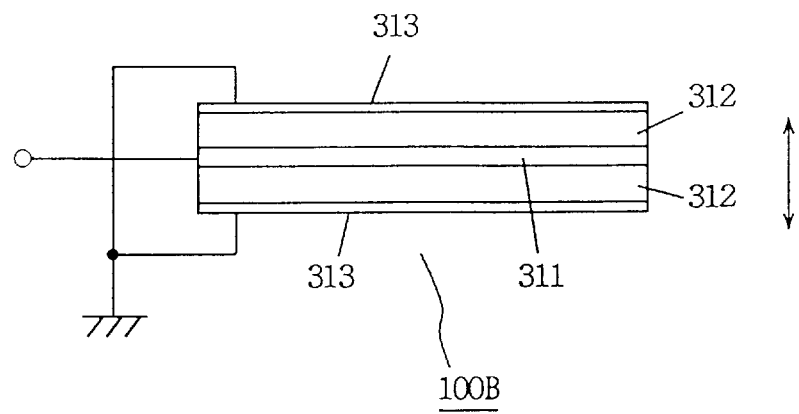
FIG. 41 is a sectional view of an example of a bimorph piezoelectric actuator used in the present invention.

FIG. 41 is a sectional view of one example of a bimorph piezoelectric actuator 100B. Two piezoceramic layers 312, 312 with electrodes 313, 313 formed thereon are cemented to each other with a intermediate electrode 311 therebetween. By applying voltage across electrodes 311 and 313 via slip ring 309 and brush 310, piezoceramic layers 312 and 312 bend, whereby magnetic head group BT is displaced in the vertical direction. Piezoactuator 100A operates in a similar manner.

Next, a case of moving magnet type actuators 100A and 100B mounted will be described hereinafter. Although moving magnet type actuators 100A and 100B are formed of a parallel leaf spring mechanism, a magnetic circuit, and driving coils which will be described afterwards, movable members 425a and 425b which will be described afterwards are referred to as actuators 100A, 100B hereinafter. Here, actuators 100A and 100B are driven simultaneously by the same driving circuit. It is to be noted that actuators 100A and 100B are displaced in opposite directions.

Figure 42:
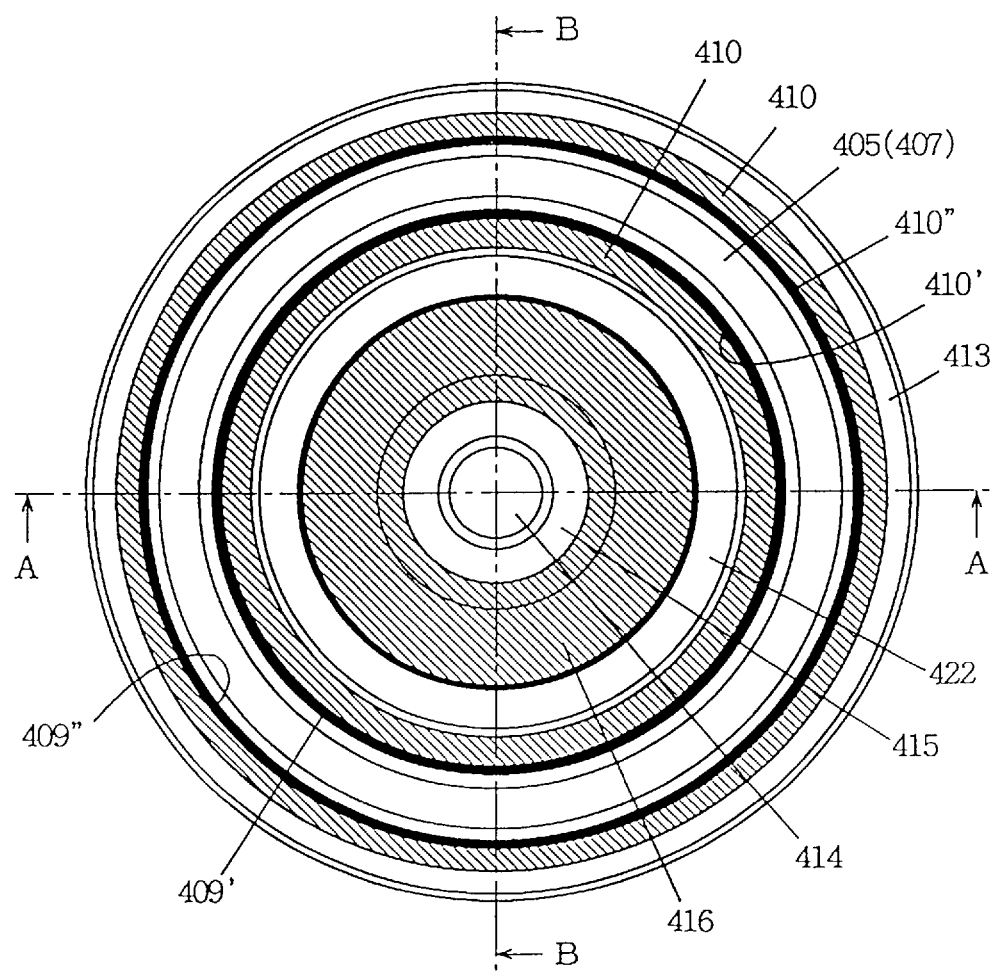
FIGS. 42 and 43 are schematic plan view of a drum apparatus used in the present invention.
Figure 43:
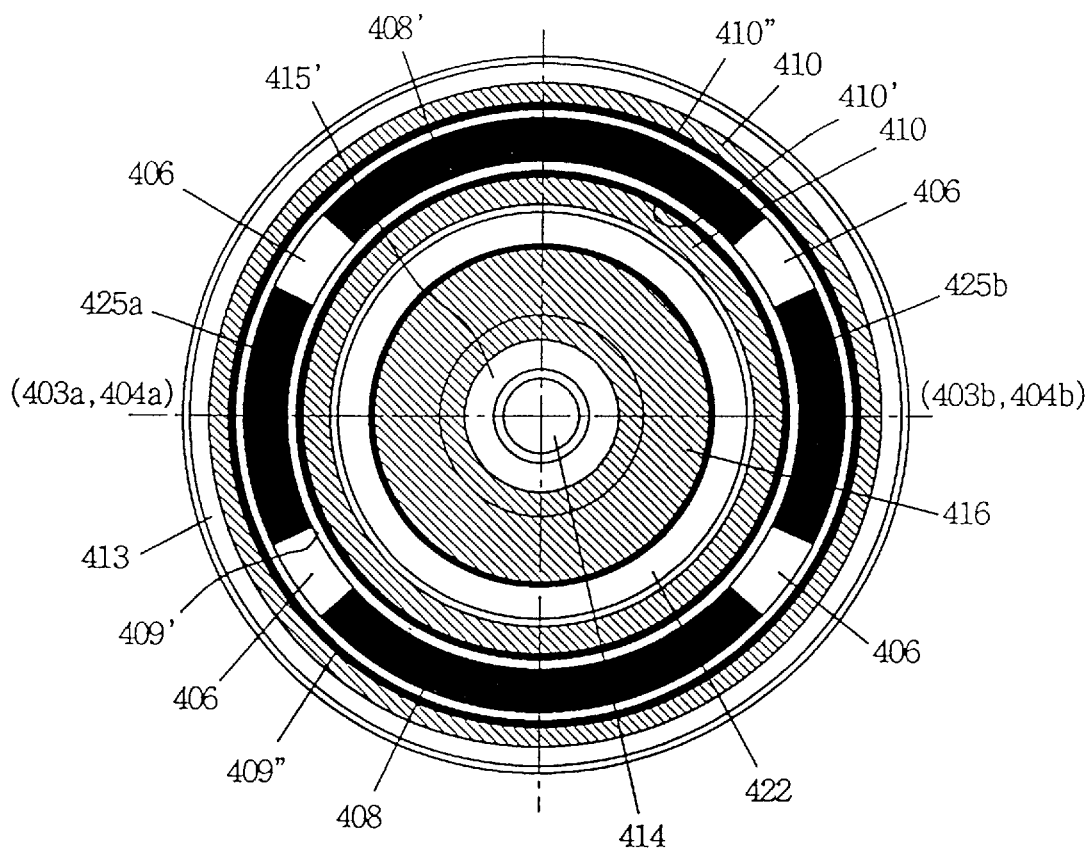
Figure 44:
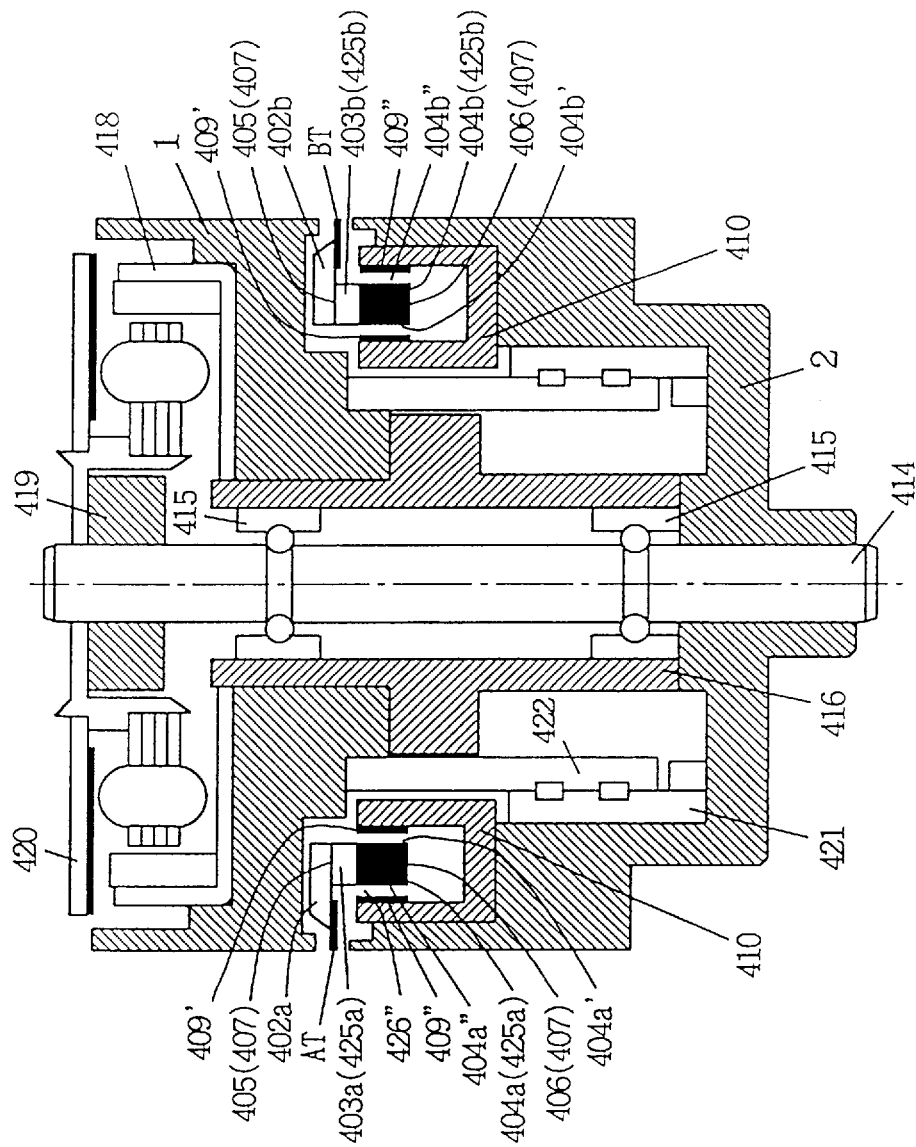
FIG. 44 and FIG. 45 are sectional views of a drum apparatus used in the present invention.
Figure 45:
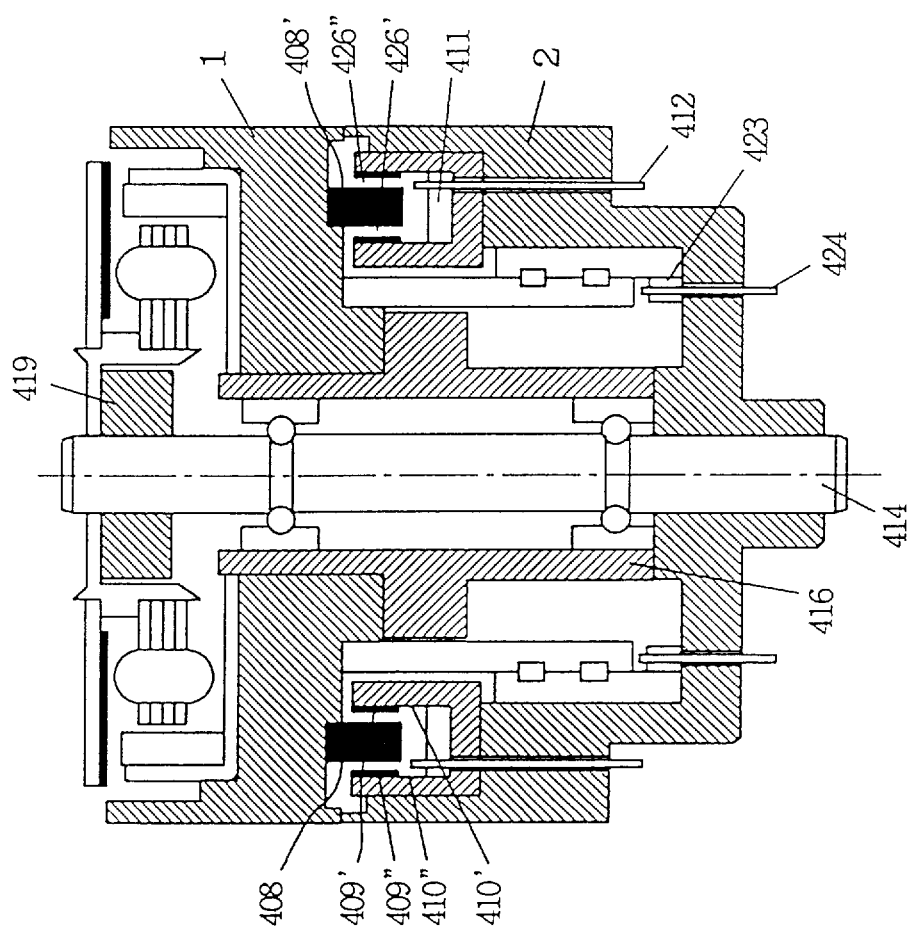
Figure 46:
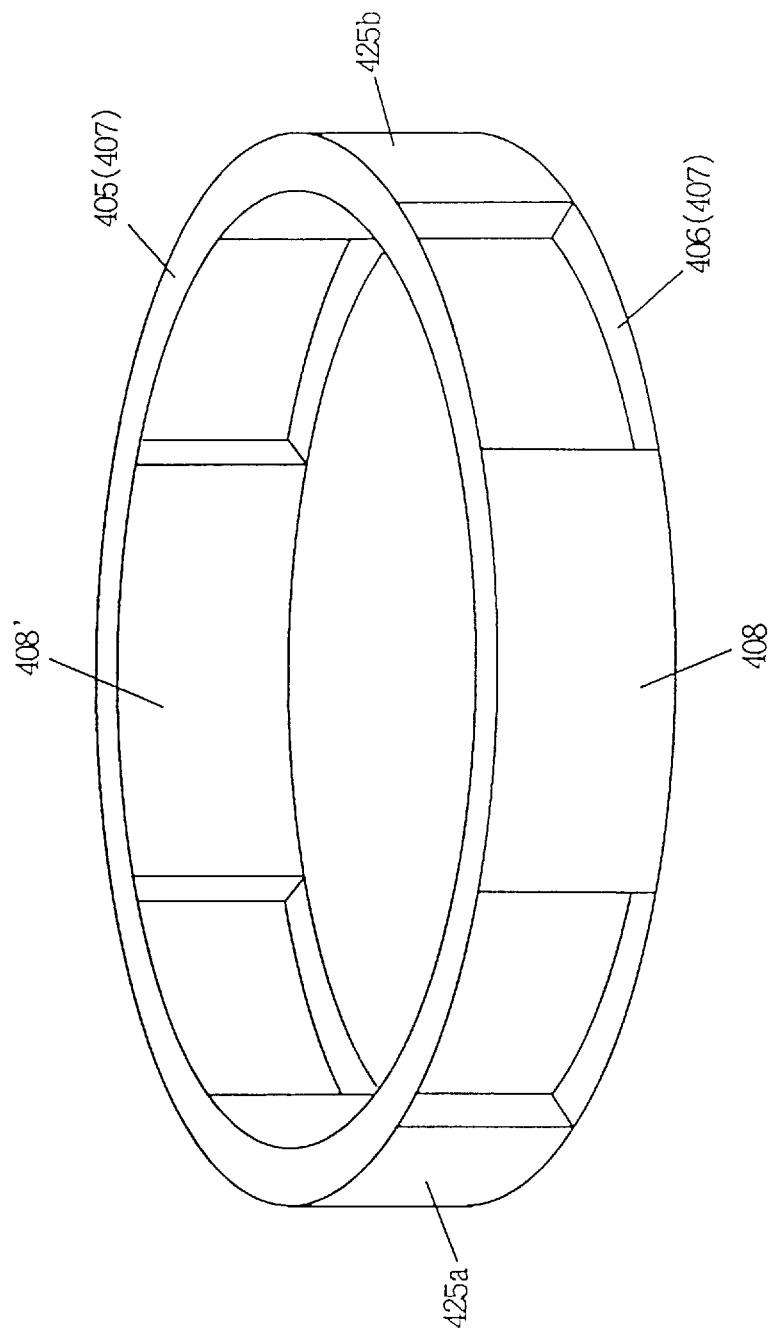
FIG. 46 is a perspective view of a parallel leaf spring of the drum apparatus used in a present invention.

FIG. 42 is a top view of a drum apparatus of the present embodiment with the illustration of motor 418, 420, collar 419, rotary drum 1, head bases 402a, 402b, and magnetic head groups AT and BT omitted. FIG. 43 is a top view of the present drum apparatus with the illustration of a first leaf spring 405 further omitted. FIGS. 44 and 45 are sectional views taken along lines A—A and B—B, respectively of FIG. 42. FIG. 46 is a perspective view of a parallel leaf spring 407 which will be described afterwards. Although a drum apparatus of a shaft fixed type will be described, the configuration of the drum apparatus is not limited to this, and a shaft rotation type drum apparatus may be used.

The components of the present drum apparatus will be described. There are provided a shaft 414, outer bearings 415, 415, and a disk 416. Disk 416 fixed to the outer circumference of outer bearings 415, 415 is maintained in a rotatable manner with respect to shaft 414. A stator core 421 of a rotary transformer, a terminal base 423 of a terminal 424 which is connected to the coil of stator core 421, and an annular yoke 410 having a concave cross section forming a magnetic circuit with permanent magnets 404a and 404b are fixed to a fixed drum 2. Annular driving coils 409', 409" are fixed to the two sidewalls 410' and 410", respectively, inside yoke 410. A terminal 412 provided on a terminal base 411 is connected to driving coil 409' or 409". Although not shown, there may be two or four terminals.

Rotary drum 1 has ring-like first and second leaf springs 405 and 406 fixed by means of two fixed members 408 and 408' located facing each other by 180°. First and second leaf springs 405 and 406 form a parallel leaf spring 407. Parallel leaf spring 407 sandwiches movable members 425a and 425b at the two movable ends facing each other by 180°.

Movable member 425a has a two layered structure of a permanent magnet 404a and a spacer 403a of a nonmagnetic material. On movable member 425a, a head base 402a having magnetic head group AT fixed is attached by means of first leaf spring 405. Here, permanent magnet 404a is magnetized in the radial direction of the rotating locus. The magnetization of permanent magnet 404b of movable member 425b is opposite in direction to that of permanent magnet 404a. The remaining structure of movable member 425b is similar to that of movable member 425a. 418 and 420 are a rotor and a stator, respectively, of the motor. Although fixed members 408 and 408' are fixed to rotary drum 1 in the present embodiment, they may be fixed to disc 416.

Assembly of the present drum apparatus will be described hereinafter. After shaft 414 is fixed to fixed drum 2 by pressure fitting, thermal fitting or the like, rotary drum 1 is fixed to disc 416 rotatable with respect to shaft 414. Under this state, rotary drum 1 is held in a rotatable manner with respect to fixed drum 2. Next, rotor 418 of the motor is fixed at the upper face of rotary drum 1, and collar 419 is fixed to shaft 414. Finally, stator 420 of the motor is fixed to collar 419. According to the above-described structure, rotary drum 1 which is substantially integral with rotor 418 of the motor is rotated by a rotary driving force of the motor with respect to fixed drum 2 that is substantially integral with stator 420 of the motor.

Next, operations of actuators 100A (movable member 425a) and 100B (movable member 425b) will be described. Because magnetic head group AT is indirectly fixed to movable member 425a of parallel leaf spring 407 which has fixed members 408 and 408' which are fixed to rotary drum 1 as the fixed ends, it can be displaced in the vertical direction (a perpendicular direction with respect to the rotating face). Permanent magnet 404a forming movable member 425a is magnetized in the radial direction of the rotator locus. Two magnetic poles 404a' and 404a'' of permanent magnet 404a face the two sidewalls 410' and 410'', respectively of yoke 410 fixed to the fixed drum 2 with gaps 426' and 426'' to form a closed magnetic circuit.

Driving coils 409' and 409'' are fixed to the two sidewalls 410' and 410'', respectively, of yoke 410. Driving coils 409' and 409'' cross the magnetic flux passing through gaps 426' and 426''.

When currents of the same direction are supplied to driving coils 409' and 409'' via terminal 412, the electromagnetic forces from driving coils 409' and 409'' act upon the magnetic poles 404a' and 404a'', respectively, of permanent magnet 404a. It is to be noted that electromagnetic force of the same direction acts upon magnetic poles 404a'' and 404a''', and the acting direction is in the vertical direction. Movable member 425a and magnetic head group AT are displaced to a position where the electromagnetic force acting on permanent magnet 404a and the reactive force of parallel leaf spring 407 are in balance. Because permanent magnet 404b of movable member 425b is magnetized in a direction opposite to that of permanent magnet 404a, movable member 425b is displaced in a direction opposite to that of movable member 425a. Therefore, by applying a current to driving coils 409' and 409'', magnetic head groups AT and BT are displaced in opposite directions.

The structure of each magnetic head group where the magnetic head group includes a plurality of magnetic heads will be described hereinafter. Although one magnetic head group AT will be described, this description applies also to the other magnetic head group BT. Magnetic heads $A_1$, $A_2$, ..., $A_n$ of magnetic head group AT are formed integrally with accurate control during manufacturing so that adjacent magnetic heads have a difference in height equal to the track pitch Tp (track width Tw) of a general signal recording operation.

Figure 3:
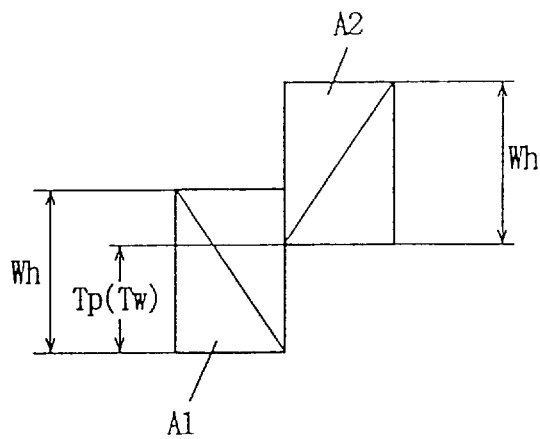
FIG. 3 is a diagram for describing the structure of a magnetic head group used in the present invention.

Two adjacent magnetic heads have different azimuth angles. As an example of a structure of a magnetic head group, a magnetic head group AT with a structure of two magnetic heads $A_1$ and $A_2$ is shown in FIG. 3. Each magnetic head has a width of Wh and the relationship with the track pitch Tp is as follows:

$$Tp < Wh < 2Tp \qquad (1)$$

Figure 4:
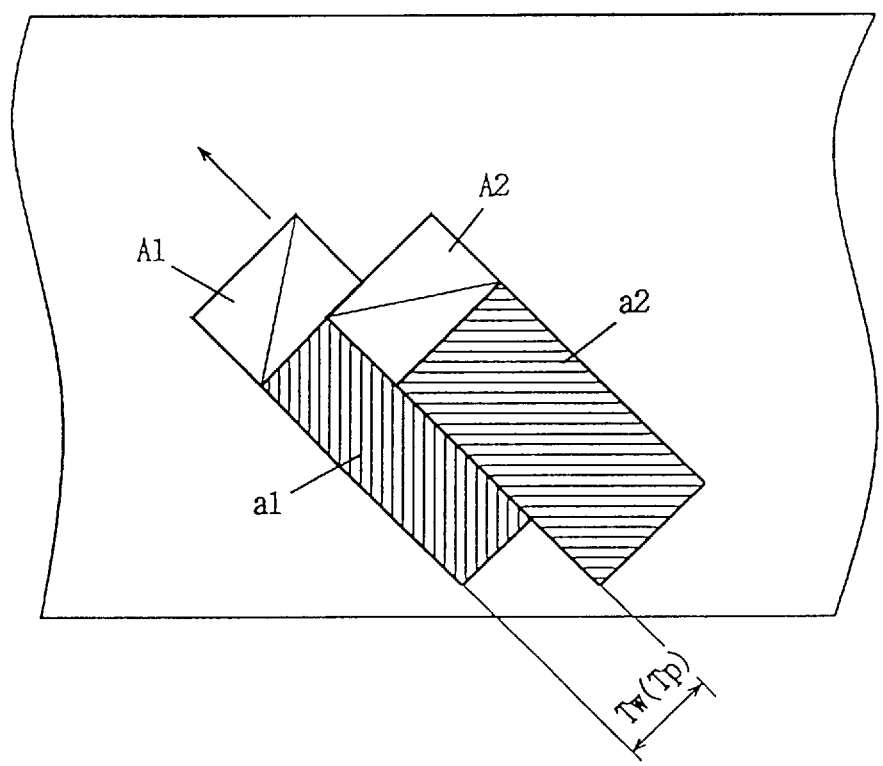
FIG. 4 is a diagram showing a track pattern by a magnetic head group used in the present invention.

Here, the width of track $a_1$ formed by magnetic head $A_1$ during signal recording becomes a predetermined track width Tw (=Tp) as shown in FIG. 4. This applies even when the tape running speed or the speed of rotation of the magnetic head group changes.

Figure 5:
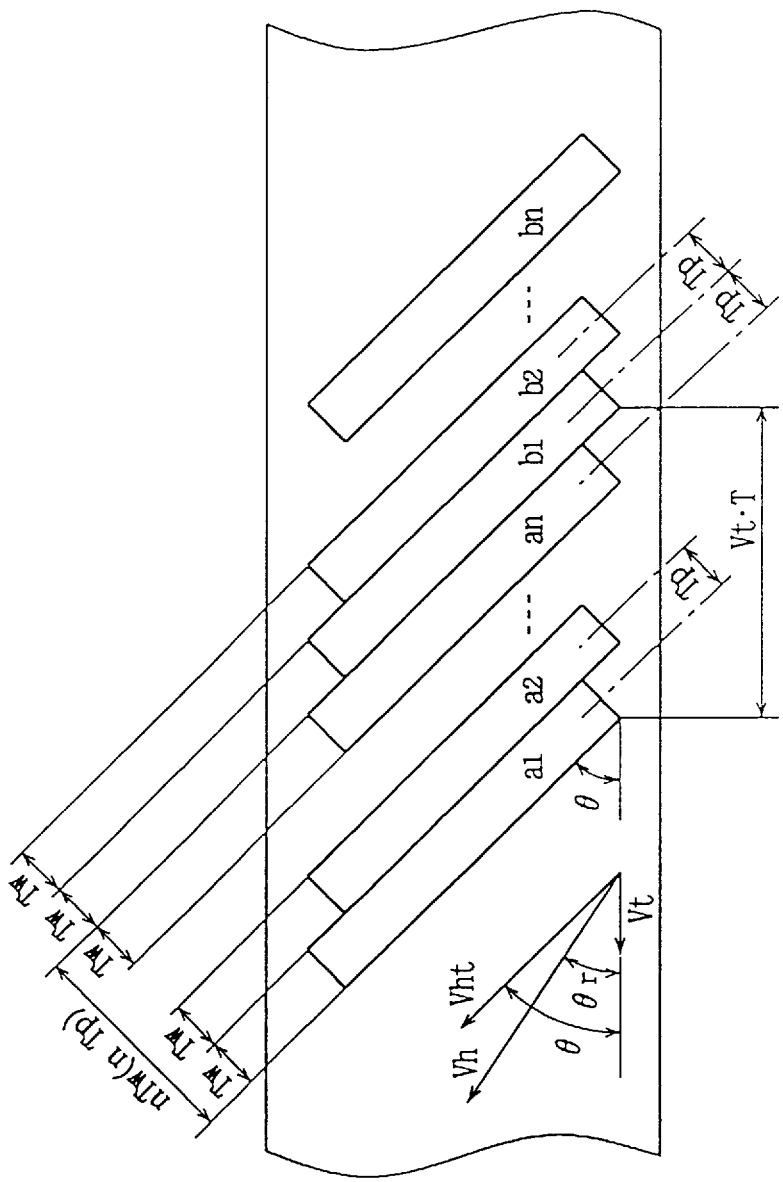
FIG. 5 is a diagram showing a track pattern in a general signal recording operation by a magnetic head group used in the present invention.

A track pattern formed by magnetic head groups AT and BT in a general signal recording operation will be described hereinafter with reference to FIG. 5. FIG. 5 shows a track pattern in which magnetic head groups AT and BT each have n magnetic heads with a relative height of 8 between magnetic head groups AT and BT being zero. Here, δ represents the relative height of magnetic head group BT with respect to magnetic head group AT. Each of tracks $a_1$, $a_2$, ..., $a_n$, $b_1$, $b_2$, ..., $b_n$ formed by magnetic heads $A_1$, $A_2$, ..., $A_n$, $B_1$, $B_2$, ..., $B_n$ respectively, has a track width of Tw and a track pitch of Tp. In such a guard-bandless recording operation, Tw=Tp.

The width of each of tracks $a_1 \sim a_{n-1}$, $b_1 \sim b_{n-1}$ becomes a predetermined track width of Tw since a difference in height is provided between adjacent magnetic heads equal to a track width of Tw (track pitch Tp) as described above in conjunction with FIGS. 3 and 4. Each of tracks $a_n$ and $b_n$ has a predetermined track width Tw (=Tp) since the tape running speed Vt is set as in the following equation (2):

$$Vt = (nTp/\sin\theta)/T \qquad (2)$$

where θ is a track angle, and T is the time required for magnetic head groups AT and BT to be rotated by 180°. Track angle θ can be represented as in the following equation (3):

$$\theta = \operatorname{Tan}^{-1}\{V_h \cdot \sin\theta_r/(V_h \cdot \cos\theta_r - V_t)\} \qquad (3)$$

where the speed of rotation of the head group is $V_h$ and the still angle is $\theta_r$.

When $V_t$=18.831 mm/sec, $V_h$=10226 mm/sec, and $\theta_r$=9.150°, the track angle is θ=9.1668°.

The scanning locus of the magnetic head group on a magnetic tape will be described hereinafter when the tape speed or the speed of rotation of the magnetic head group is varied. According to the above-described cases, the distance L1 by which the magnetic tape moves during α° rotation of magnetic head groups AT and BT, and track angle θ1 can be represented as follows according to the above equations of (2) and (3).

(i) When tape speed is $1/n_1$ times the speed $V_t$ of a general recording and reproduction operation:

$$L1 = V_t/n_1 \cdot (\alpha/180)T = \{(n/n_1) \cdot T_p/\sin\theta\} \cdot (\alpha/180) \qquad (4)$$

$$\theta 1 = \operatorname{Tan}^{-1}\{V_h \cdot \sin\theta_r/(V_h \cdot \cos\theta_r - V_t/n_1)\} \qquad (5)$$

(ii) When the speed of rotation of the head group is $n_1$ times the speed $V_h$ of a general recording and reproducing operation (the time required for magnetic head groups AT and BT to rotate 180° is $1/n_1$ times the time T of a general recording and reproducing operation):

$$L1 = V_t \cdot (\alpha/180) \cdot (T/n_1) = \{(n/n_1) \cdot Tp/\sin\theta\} \cdot (\alpha/180) \qquad (6)$$

$$\theta 1 = \operatorname{Tan}^{-1}\{n_1 \cdot V_h \cdot \sin\theta_r/(n_1 \cdot V_h \cdot \cos\theta_r - V_t)\} \qquad (7)$$

It is appreciated from the above equations (4)–(7) that the locus on the magnetic tape by the magnetic head groups is identical on the above both cases, and their cases will not be distinguished particularly hereafter.

When $V_t=18.831$ mm/sec, $V_h=10226$ mm/sec, and $\theta_r=9.150°$, $V_h \cdot \cos\theta_r$ becomes extremely greater than $V_t$, so that the following equation is established.

$$\sin\theta 1 \approx \sin\theta \tag{8}$$

Therefore, equations (4) and (6) can be expressed as follows:

$$L1=\{(n/n_1)\cdot Tp/\sin\theta 1\}\cdot(\alpha/180) \tag{9}$$

Therefore, the distances L1 (180°) and L1 (360°) that the magnetic tape travels during a 180° and 360° rotation of magnetic head groups AT and BT can be expressed as:

$$L1(180°)=(n/n_1)\cdot(Tp/\sin\theta 1) \tag{10}$$

$$L1(360°)=2(n/n_1)\cdot(Tp/\sin\theta 1) \tag{11}$$

From these equations (10) and (11), the following equations are obtained:

$$L1(180°)\cdot\sin\theta 1=(n/n_1)\cdot Tp \tag{12}$$

$$L1(360°)\cdot\sin\theta 1=2(n/n_1)\cdot Tp \tag{13}$$

Each embodiment of the present invention will be described hereinafter.

A first embodiment of the present invention will be described according to the flow chart of FIG. 6. In the first embodiment, magnetic head groups AT include one magnetic head $A_1$ and magnetic head group BT includes one magnetic head $B_1$.

Figure 7:
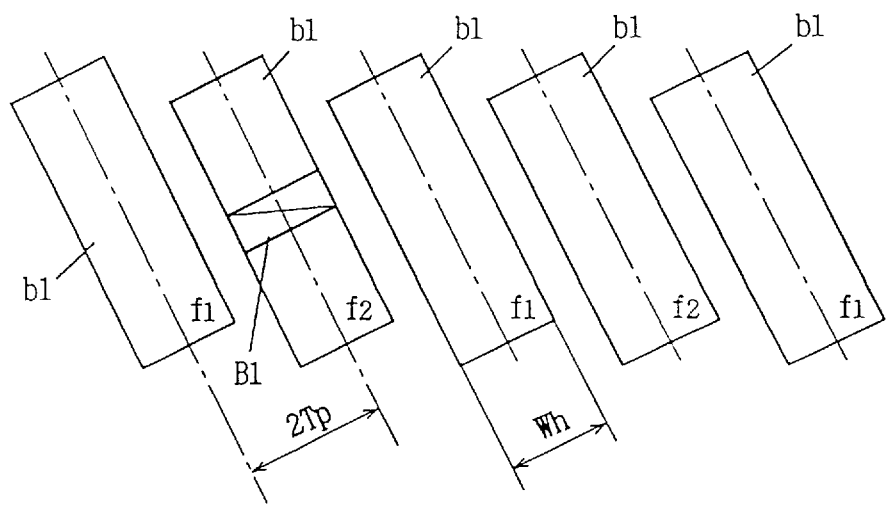
FIGS. 7–9 are schematic diagrams for describing a method of adjusting the head height according to the first embodiment.

(I) First, a signal which becomes the reference for the relative height adjustment between magnetic heads $A_1$ and $B_1$ is recorded on a magnetic tape using only one of the pair of rotary magnetic heads $A_1$ and $B_1$, for example, magnetic head $B_1$ (step S1). Here, actuator 100B on which magnetic head $B_1$ is mounted is not operated. FIG. 7 shows tracks $b_1$, $b_1$, . . . formed on a magnetic tape by magnetic head $B_1$. Signals recorded on tracks $b_1$, $b_1$, . . . are cyclical signals according to a certain rule.

In the following description, it is assumed that signals of different frequencies $f_1$, $f_2$, $f_1$, . . . are cyclically recorded at an equal level. These signals are referred to as pilot signals hereinafter. It is to be noted that such pilot signals may be recorded to be superimposed on a main signal. The frequency of each pilot signal is set to a low value so that it can be reproduced even with a magnetic head of different azimuth. The width of each tracks $b_1$, $b_1$, . . . is equal to the width Wh of the magnetic head. The track pitch is two times the track pitch Tp of a general signal recording operation, i.e., 2 Tp. From the prior equation (1), the following relationship is established:

$$Wh<2Tp \tag{14}$$

From this relationship, an unrecorded space is generated between tracks as shown in FIG. 7. In a general signal recording operation, a track by a magnetic head $A_1$ is formed on this space. In this case, a track by magnetic head $A_1$ will be overlaid on tracks by magnetic head $B_1$ in some regions. After the above-described pilot signals $f_1$ and $f_2$ are alternately recorded during a constant period, the magnetic tape is rewound (step S1), and a reproduction operation for adjusting the relative height is initiated.

Figure 8:
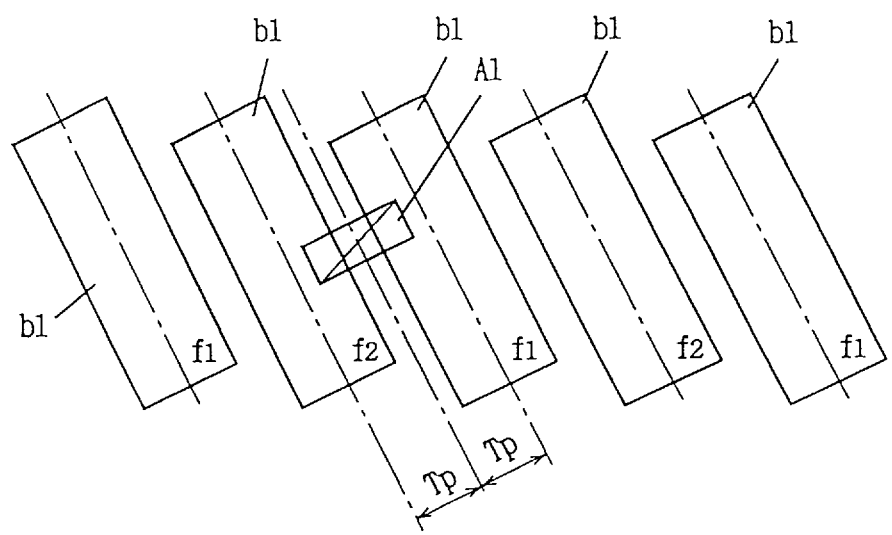

(II) FIG. 8 shows the relationship between tracks and head $A_1$ when tracks $b_1$ recorded by magnetic head $B_1$ as described above are reproduced using the other magnetic head $A_1$. Here, actuator 100A on which magnetic head $A_1$ is mounted is not operated. Magnetic head $A_1$ reproduces pilot signals $f_1$ and $f_2$ so as to bridge over two tracks $b_1$ and $b_1$ spaced apart by two times the track pitch Tp (2 Tp). Here, the running travel of the tape is controlled by, for example, capstan control, so that pilot signals $f_1$ and $f_2$ reproduced from both tracks $b_1$ and $b_1$ have an equal level, i.e. so that the tracks on which pilot signals $f_1$ and $f_2$ have been recorded can be traced equally (step S2).

The tape running control is repeatedly carried out by rotating magnetic head $A_1$ several times until the above-described object is achieved (step S3). It is not necessary to repeat the above-described scanning by head $A_1$ if control of the tape travel is carried out sufficiently when magnetic head $A_1$ scans the magnetic tape only once.

Figure 9:
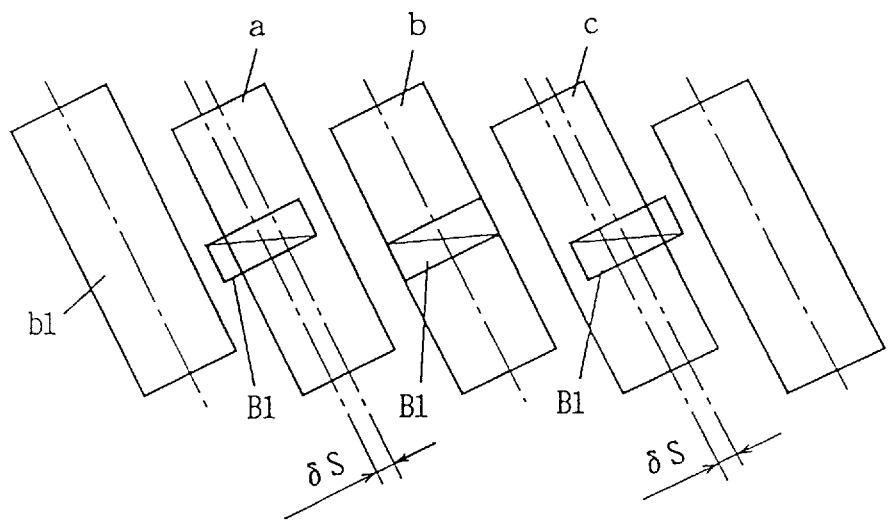

(III) FIG. 9 shows the relationship between head $B_1$ and the tracks when tracks $b_1$, $b_1$, . . . in which pilot signals $f_1$ and $f_2$ have been recorded are reproduced using the one magnetic head $B_1$. When the relative height $\delta$ between heads $A_1$ and $B_1$ is zero, the scanning locus of head $B_1$ matches the record track as shown in the state of b in FIG. 9. Here, the reproduced output from that head $B_1$ is maximum. It is assumed that $\delta$ particularly represents the relative height of magnetic head $B_1$ with respect to magnetic head $A_1$.

When there is deviation in the relative height between the heads, the center line of the track will not coincide with the center line of head $B_1$, and the magnetic head will slightly deviate from the track as shown in the states of a ($\delta=-\delta S$) and c ($\delta=\delta S$) as shown in FIG. 9. There will be portions in the track that are not reproduced, resulting in degradation of the reproduced output of the magnetic head.

Figure 10:
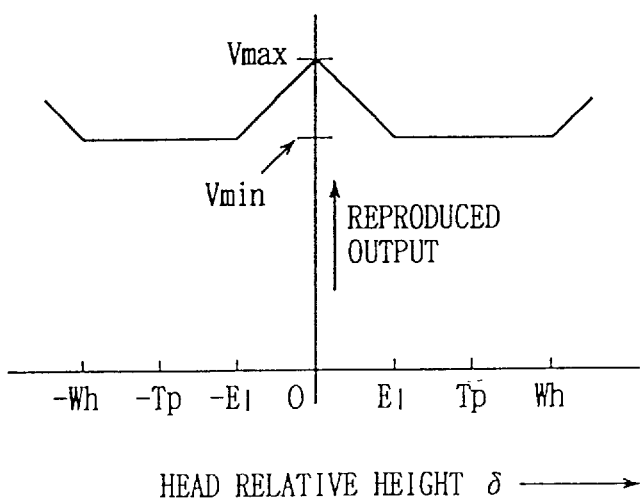
FIG. 10 is a graph showing the relationship between the head relative height and the head reproduced output according to the first embodiment.

More specifically, the output from the head shows a maximum output of $V_{max}$ when the head relative height $\delta$ is zero, and the reproduced output is degraded as the + or − relative height $\delta$ increases, as shown in FIG. 10. When the relative height further increases and the upper or lower edge of head $B_1$ reaches an adjacent track (here, the relative height is $\delta=\pm E_1$), the reproduced output of head $B_1$ will take a constant value of $V_{min}$ thereafter. Therefore, $E_1$ and $V_{min}$ are presented by the following equations:

$$E_1=2Tp-Wh$$

$$V_{min}=V_{max}\times(W_h-E_1)/Wh \tag{15}$$

When magnetic head $B_1$ is completely deviated from the track to be scanned (relative height $\delta=\pm Wh$), head $B_1$ will reproduce only an adjacent track, and the reproduced output will be increased again.

According to the above-described first embodiment of the present invention, an offset signal to be applied to actuators for relative height adjustment is measured taking advantage of the above-described feature. Here, an offset signal implies voltage or current applied to actuators 100A and 100B.

Several levels of offset signals are prepared in advance step-like manner to be applied to actuator 100B to which magnetic head $B_1$ is attached. Relative height adjustment can be carried out with further accuracy if the step-changing amount is smaller.

When track $b_1$ in which a pilot signal has been recorded is to be traced by head $B_1$, the prepared plurality of offset signals are sequentially applied to actuator 100B (step S4), and the reproduced outputs of head $B_1$ for respective offset signals are measured sequentially (step S5). The offset signal applied to the actuator may be sequentially varied for each scanning operation, or a plurality of levels of offset signals may be applied in a step-like manner in one scanning operation. The flow chart of FIG. 6 shows the case of the latter. All the prepared offset signals are applied to the actuator during one scanning time period to detect respective levels of the reproduced outputs. The reproduced output with the maximum level, i.e. the offset signal when the relative height δ is 0, is identified (step S6). Therefore, when the head relative height is δ, the displacement amount of that actuator corresponding to the offset signal causing a maximum level of reproduced output becomes −δ.

Figure 6:
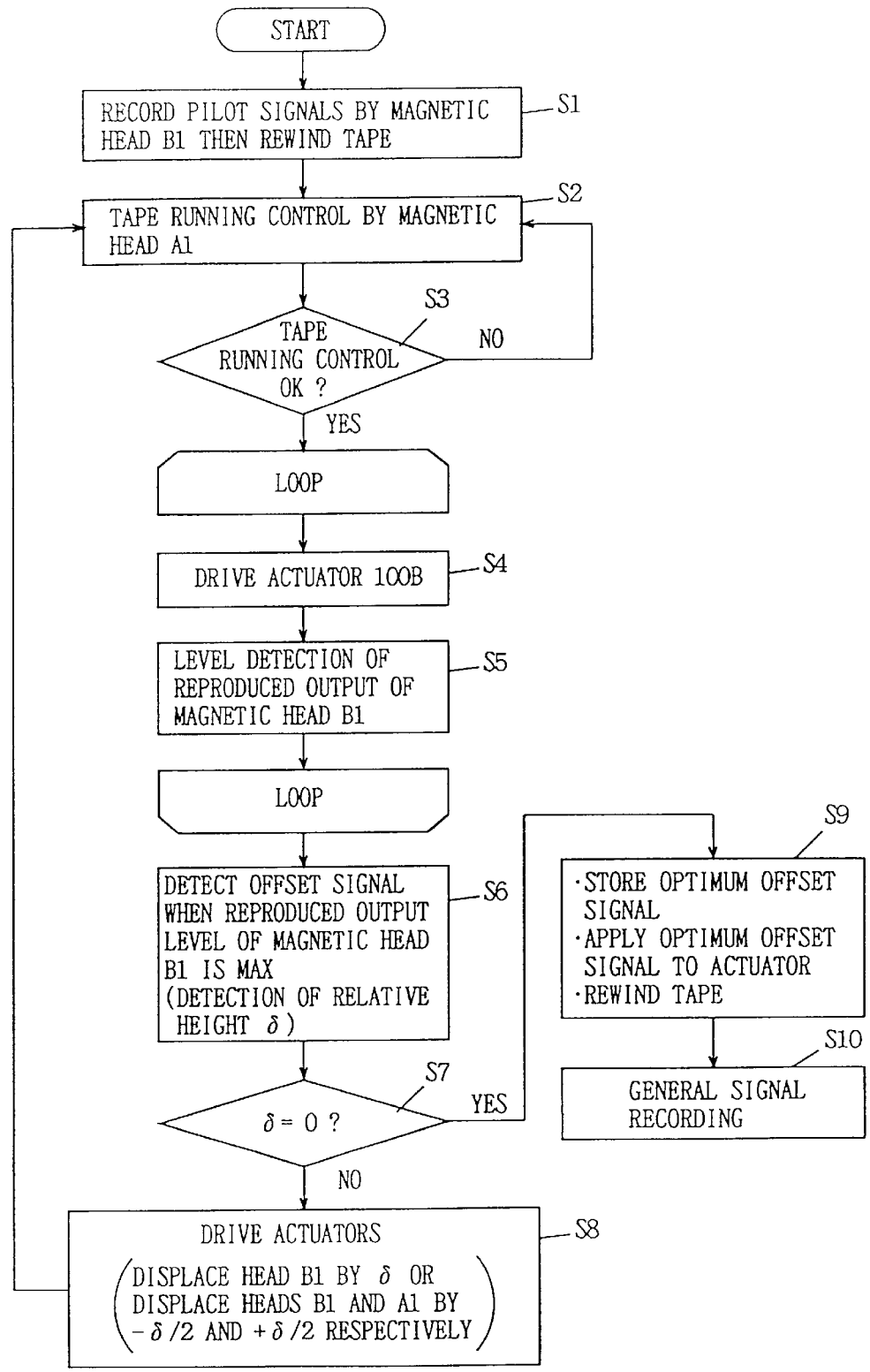
FIG. 6 is a flow chart showing a method of adjusting the head height according to a first embodiment of the present invention.

(IV) According to the above operation of (III), i.e., according to information concerning relative height δ detected by steps S4–S6 of FIG. 6, adjustment of the relative height of the heads is carried out by one of the following ways.

(1) An offset signal corresponding to the displacement of −δ is applied only to actuator 100B, whereby magnetic head $B_1$ is displaced by −δ (step S8). Here, actuator 100A to which magnetic head A1 is attached is not displaced. This method is effective especially when actuators 100A and 100B are driven independently by independent driving circuit, for example, as shown in the above described FIGS. 39 to 41.

(2) Offset signals corresponding to the displacement of δ/2 and −δ/2 are applied to actuators 100A and 100B, respectively, whereby magnetic heads $A_1$ and $B_1$ are displaced by δ/2 and −δ/2, respectively, in opposite directions (step S8). This method is effective especially when actuators 100A and 100B are driven simultaneously to be displaced respectively in opposite directions by the same driving circuit, for example, as shown in the above described FIGS. 42 to 46.

Relative height adjustment of higher accuracy can be carried out by repeating the above operations of (II), (III) and (IV) several times. Accordingly, the detected error of the relative height of the heads is averaged, and the relative height 8 of magnetic heads $A_1$ and $B_1$ is gradually converged to zero. Although the flow chart of FIG. 6 shows that the operations of (III) and (IV) are repeated, a repeating operation does not have to be carried out. When the relative height adjustment is completed (step S7), the offset signals applied to actuators 100A and 100B are respectively stored (step S9). These offset signals are called the optimum offset signals. Then, on condition that the above-described optimum offset signals are constantly applied to actuators 100A and 100B (step S9), the tape is rewound and a general signal is recorded erasing the above-described recorded tracks (step S10).

Relative height adjustment can be carried out right before a series of general signal recording operation as described above, or at a constant interval regardless of a general signal recording operation. For example, since a VTR generally has a timer built in, an interval may be preset by the timer for carrying out relative height adjustment of the heads. When the time comes to carry out adjustment, the user is notified of the need to carry out head height adjustment by some display indication, for example, when the power switch is turned off by the user. Having been notified, the user can turn the power switch "on" at his/her convenience and perform the head height adjustment.

In response, the user prepares a tape which may be used for recording signals for head height adjustment and loads the tape into the VTR. An area in the tape is searched where a signal is not recorded, and the above-described adjustment of relative height of the heads is carried out. Because it is not necessary to erase recorded tracks according to the present invention, basically any tape may be used. After adjustment of the head relative height is completed by the above-described way, the tracks recorded for adjustment may be erased if necessary from the tape.

Figure 11:
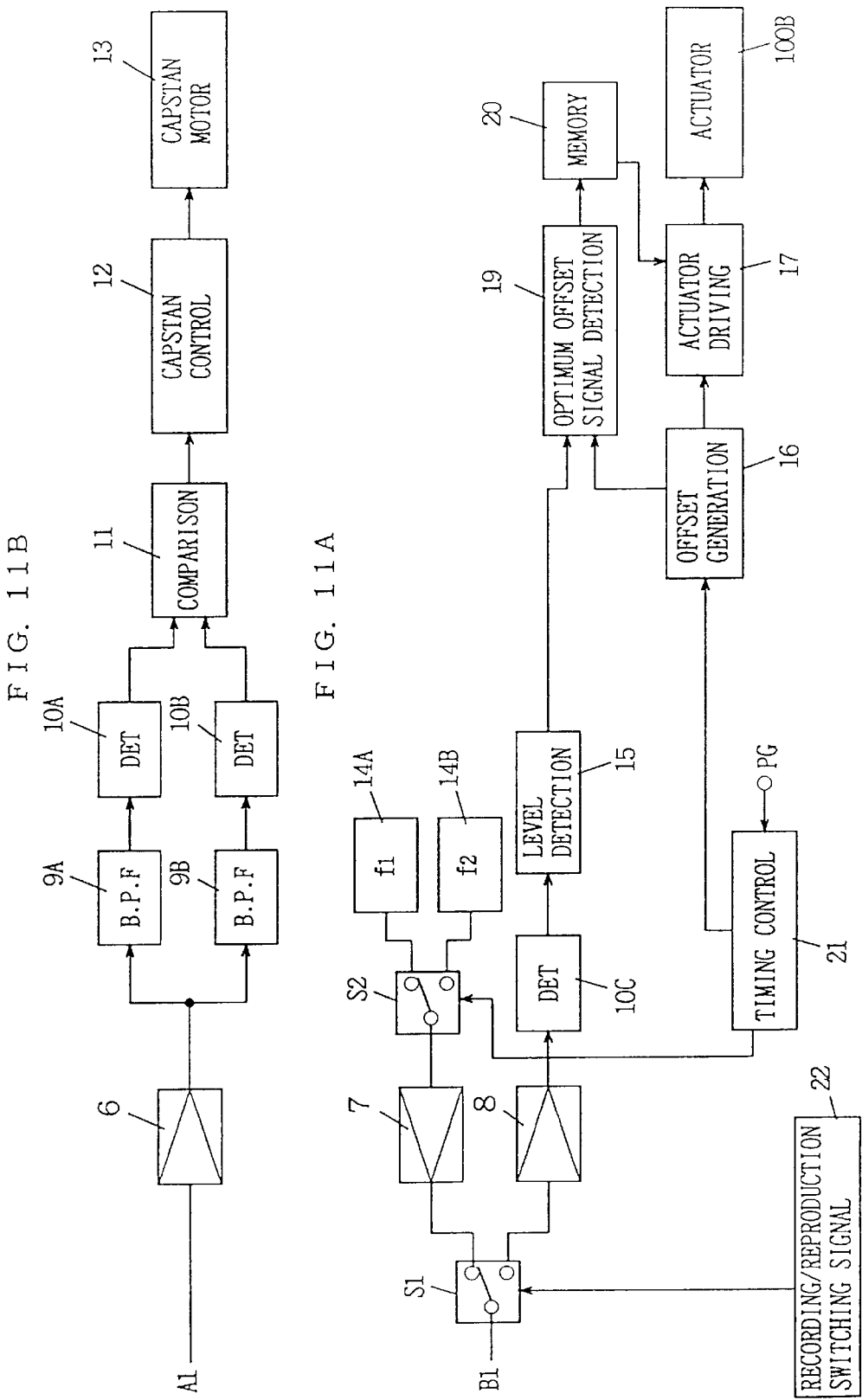
FIGS. 11A and 11B are block diagrams of the head height adjustment apparatus according to the first embodiment.

FIG. 11A and 11B are block diagrams of circuitry connected to heads $B_1$ and $A_1$ according to a first embodiment of the present invention, respectively. In the embodiment of FIG. 11, an optimum offset signal is applied only to actuator 100B to carry out adjustment of relative height, and the offset signal applied to actuator 100B for detection of an optimum offset signal is sequentially varied for each scanning operation of head $B_1$.

Referring to FIG. 11A, head $B_1$ is selectively connected by a switch $S_1$ to a circuit system connected to pilot signal generators 14A and 14B and to a circuit system connected to a memory 20 for the optimum offset signal and an actuator 100B. During a recording operation of pilot signals, two types of pilot signals $f_1$ and $f_2$ generated by pilot signal generators 14A and 14B are switched by a switch $S_2$ to be recorded by head $B_1$ on a magnetic tape via an amplifier 7 and switch $S_1$. Pilot signals $f_1$ and $f_2$ are alternately selected and recorded for every scanning operation by switch $S_2$ according to a timing signal generated by timing control circuit 21 according to pulses from a pulse generator PG in synchronization with one rotation of the rotary drum.

Referring to FIG. 11B, capstan control by head $A_1$ is carried out in the following. A reproduced signal from head $A_1$ is amplified by an amplifier 6 to have its level detected for every frequency component of pilot signals $f_1$ and $f_2$ by the circuit of two systems including bandpass filters (PPF) 9A and 9B and detectors (DET) 10A and 10B. The detected levels are compared by a comparator 11, whereby tape running control is carried out by capstan control circuit 12 and capstan motor 13 according to the polarity and level of the difference signal provided from the comparator 11.

Returning to FIG. 11A, pilot signals are reproduced by head $B_1$ for detecting an optimum offset signal. Here, a reproduced output of head $B_1$ is amplified by an amplifier 8 via switch S1 to be detected by detector (DET) 10C. Then, the reproduced output level is measured by a level detector 15. Here, a plurality of stages of offset signals prepared in advance are applied from offset generator 16 to actuator 100B of the head $B_1$ side for respective scanning operations of head $B_1$ via actuator driving circuit 17 in synchronization with timing pulses from a timing control circuit 21.

The offset signal applied at each scanning operation and the reproduced output detected by level detector 15 are applied to an optimum offset signal detector 19. When the offset signals of all stages and corresponding reproduced outputs are applied to optimum offset signal detector 19, the offset signal at the maximum reproduced output is provided as the optimum offset signal to be stored in memory 20. The stored offset signal is applied to actuator 100B of head $B_1$ as an offset signal for head relative height adjustment at a regular or general signal recording operation.

According to the above-described first embodiment of the present invention, a plurality of tracks which become the reference for adjusting the relative height of the pair of magnetic heads are formed. The pair of magnetic heads sequentially scan the plurality of tracks to detect and adjust the relative height. Therefore, the detected error of the relative height is averaged, and detection error of the relative height can be reduced which was caused by unstable contact between a magnetic tape and a magnetic head and unstable positioning of a magnetic tape.

A second embodiment of the present invention will be described hereinafter with reference to the flow chart of FIG.

12. In the present embodiment, magnetic head group AT includes n (n is at least 2) magnetic heads $A_1, A_2, \ldots A_n$ and magnetic head group BT includes n magnetic heads $B_1, B_2, \ldots, B_n$. One of divisor of n excluding 1 is k. Here, n and k have the following relationship:

$$n = m \cdot k \text{ (m: natural number, m} \neq \text{n)} \tag{16}$$

In the following description, n is an even number and m is an odd number.

(I) First, tape speed $V_{t2}$ is set to 1/k times the speed $V_t$ of a general recording and reproducing operation, or the speed of rotation of the head group $V_{h2}$ is set to k times the speed $V_h$ of a general recording and reproducing operation (step S11). Since $n_1 = k$, the following relationships are obtained by equations (12) and (13):

$$L2(180°) \cdot \sin\theta 2 = mTp \tag{17}$$

$$L2(360°) \cdot \sin\theta 2 = 2m \cdot Tp \tag{18}$$

where L2 (180°) and L2(360°) are the running distances of the magnetic tape when magnetic head groups AT and BT rotate by 180° and 360°, respectively, and θ2 is a track angle.

Then each magnetic tape scanning loci of magnetic head $A_j$ of magnetic head group AT (magnetic head $B_j$ of magnetic head group BT) are spaced apart at a distance of $2m \cdot Tp$ for every one rotation. When the relative height δ between magnetic head groups AT and BT is zero, the scanning loci on the magnetic tape of magnetic heads $A_j$ and $B_j$ have a distance of $m \cdot Tp$. The scanning loci on the tape of magnetic heads $A_j$ and $A_{j+m}$ of magnetic head group AT are spaced apart by $m \cdot Tp$. ($1 \leq j$, $j+m \leq n$).

Magnetic head $B_j$ of magnetic head group BT follows a locus identical to the scanning locus on a magnetic tape of magnetic head $A_{j+m}$ of magnetic head group AT with a lag of 180°. Similarly, magnetic head $A_j$ of magnetic head group AT follows a locus identical to the scanning locus of magnetic head $B_{j+m}$ of magnetic head group BT on a magnetic tape with a lag of 180°.

Figure 13:
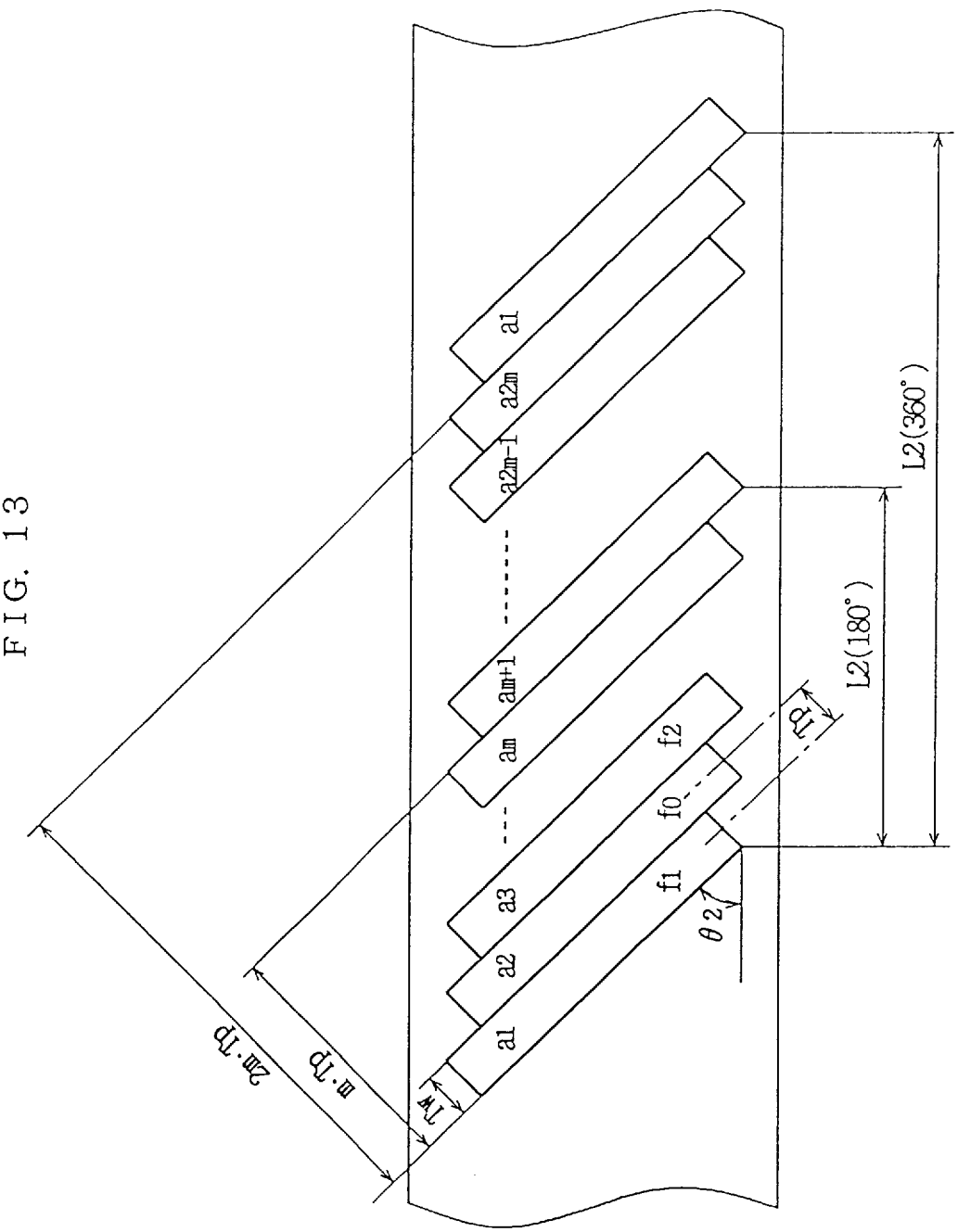
FIG. 13 is a schematic diagram for describing a method of adjusting the head height according to the second embodiment.

(II) With the tape speed $V_{t2}$ or the head group speed of rotation $V_{h2}$ set as described above, recording is carried out of signals which become the reference for the relative height adjustment between magnetic head groups AT and BT (step S12). These signals are recorded by 2m magnetic heads of magnetic head group AT, for example, magnetic heads $A_1 \sim A_{2m}$, and magnetic head group BT is not used. Here, actuator 100A to which magnetic head group AT is attached is not operated. FIG. 13 shows a track pattern thereof wherein magnetic heads $A_1 \sim A_{2m}$ form tracks $a_1, a_2, \ldots, a_{2m}, a_1, \ldots$.

Tracks $a_1$ and $a_1$ have a distance of $2m \cdot Tp$ therebetween. Each of tracks $a_1 \sim a_{2m}$ has a predetermined track width of Tw and a track pitch of Tp (Tw=Tp). Since only magnetic head group AT records this signal, the formed track pattern always shows that of FIG. 13 regardless of the relative height δ of magnetic head groups AT and BT.

The signals recorded by magnetic head $A_1 \sim A_{2m}$ of magnetic head group AT on tracks $a_1, a_2 \ldots, a_{2m}, a_1, \ldots$ may be any cyclical signals according to a certain rule. For example, signals may be used having pilot signals of different frequencies $f_1, f_0, f_2, f_0, f_1, \ldots$ cyclically superimposed on a main signal. It is assumed that superimposing a pilot signal $f_0$ means that only a main signal is recorded with nothing overlaid. Also, the frequency of the pilot signal is set to a low value so that it can be reproduced with a magnetic head of a different azimuth. After pilot signals are recorded for a predetermined time period, the magnetic tape is rewound (step S12), and a reproduction operation by magnetic head groups AT and BT for adjusting the relative height is initiated.

(III) A reproduction operation by magnetic head groups AT and BT for relative height adjustment will be described hereinafter. In this reproduction operation, both magnetic head groups AT and BT are used.

Figure 14:
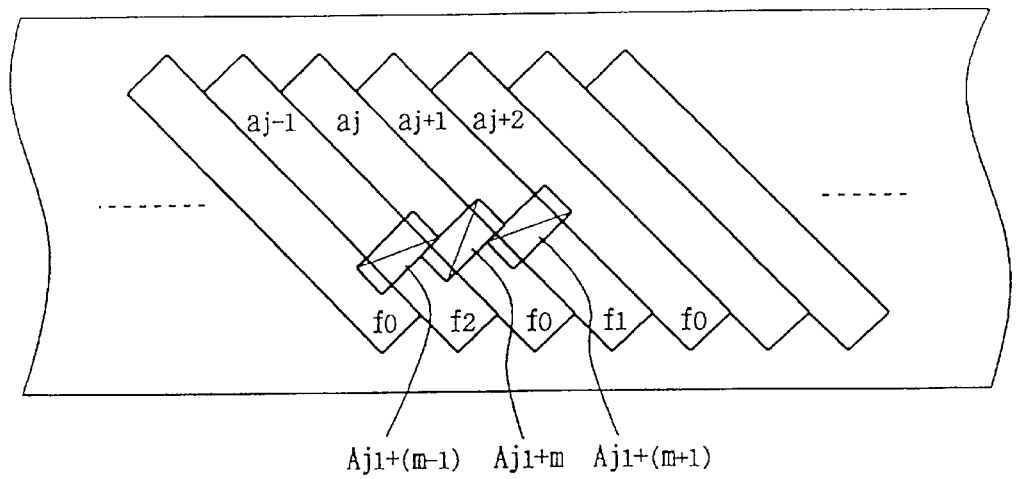
FIGS. 14 and 15 are schematic diagrams for describing the method of head height adjustment according to the second embodiment.

(III-i) Tape running control is carried out by capstan control so that at least one magnetic head, for example, magnetic head $A_{j1+m}$ ($1 \leq ji$, $j1+m \leq n$) of one magnetic head group, for example, magnetic head group AT, reproduces equally pilot signals $f_2$ and $f_1$ of two tracks $a_{j-1}$ and $a_{j+1}$ adjacent to a track $a_j$ with a distance of 2 Tp therebetween (step S13). By this tape running control, the center of the scanning locus of magnetic head $A_{j1+m}$ coincides with the center of track $a_j$. This state is shown in FIG. 14.

Here, actuator 100A to which magnetic head group AT is mounted is not operated. This tape running control is repeatedly carried out by rotating magnetic head group AT several times until the above-described object is obtained (step S14). It is not necessary to repeat the above-described scanning if sufficient tape running control is carried out while magnetic head group AT scans the magnetic tape once.

Figure 15:
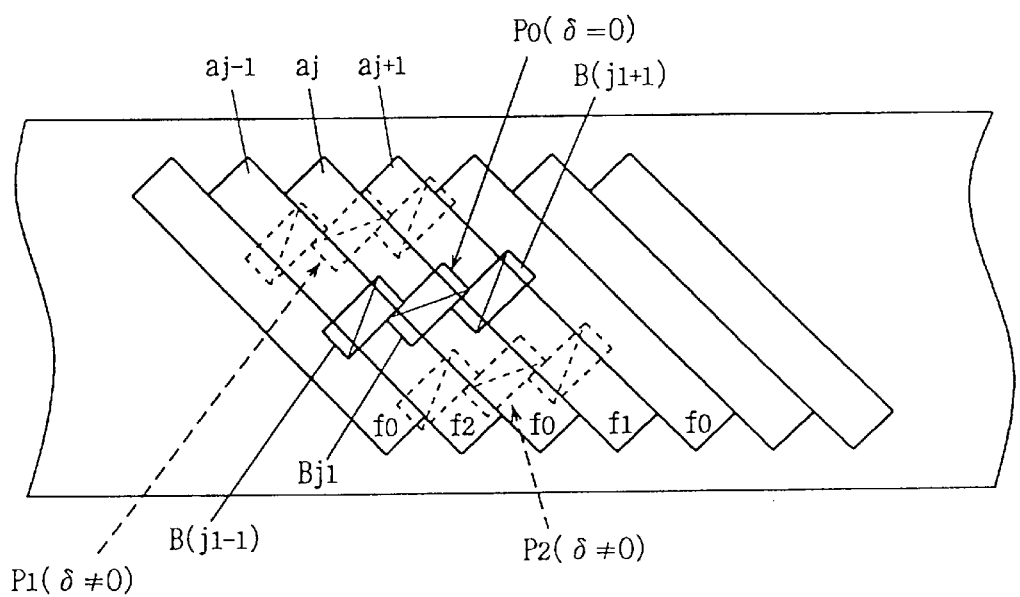

(III-ii) Under the above-described state in which tape running control is carried out, a signal is reproduced by a magnetic head $B_{j1}$ of magnetic head group BT. FIG. 15 shows the position relationship between tracks and magnetic head group BT. Here, δ represents the relative height of magnetic head group BT with respect to magnetic head group AT. When δ=0 (position P0 in the drawing), magnetic head $B_{j1}$ scans a locus identical to the scanning locus of magnetic head $A_{j1+m}$ as described above, so that pilot signals $f_2$ and $f_1$ of tracks $a_{j-1}$, and $a_{j+1}$ adjacent to track $a_j$ are reproduced equally. When δ≠0 (positions P1 and P2 in the drawing), pilot signals $f_1$ and $f_2$ reproduced by magnetic head $B_{j1}$ have different levels from each other. The difference in level of pilot signals $f_1$ and $f_2$ is referred to as an error signal Sp.

$$Sp = \text{(reproduced level of pilot signal } f_1\text{)} - \text{(reproduced level of pilot signal } f_2\text{)} \tag{19}$$

Figure 16:
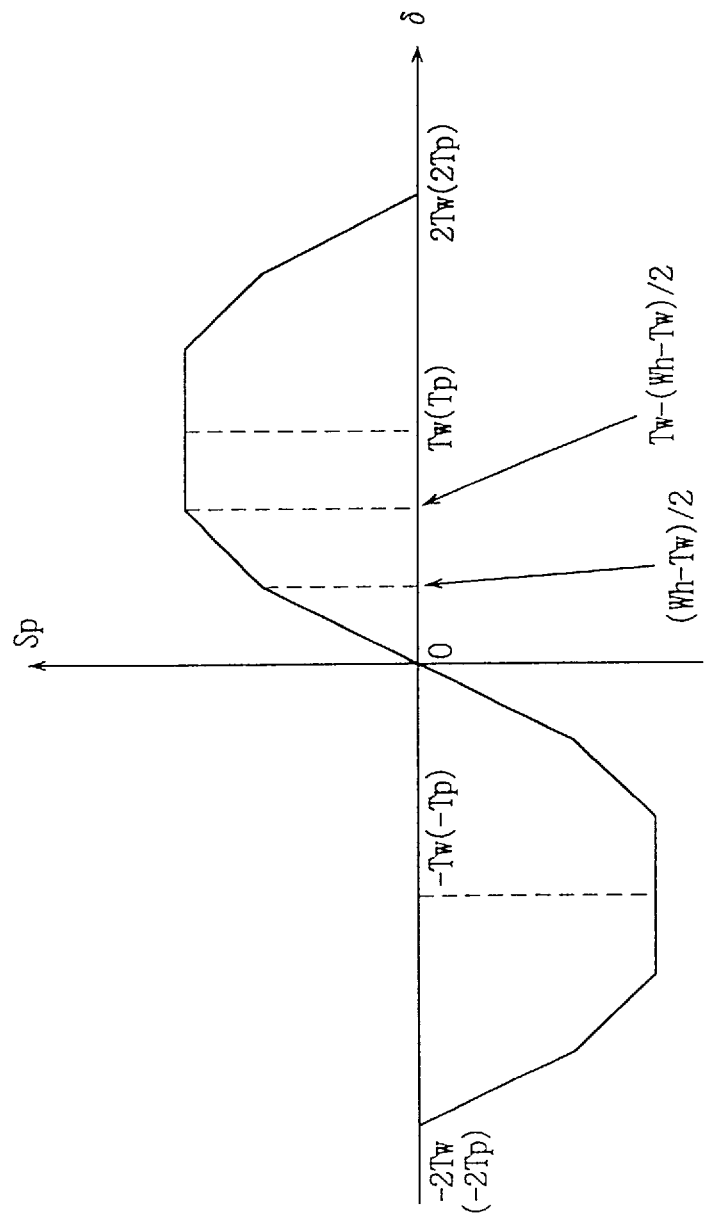
FIG. 16 is a graph showing the relationship between the relative height of the heads and an error signal.

FIG. 16 is a graph showing the relationship between a relative height 8 and an error signal Sp. Detection of relative height δ is specifically carried out by any of the following procedures.

(a) By controlling actuator 100B so that error signal Sp becomes 0, the offset signal applied to actuator 100B at that time is obtained (step S15). Displacement corresponding to the above-described offset signal by which error signal Sp becomes 0 when relative height is δ corresponds to −δ. The offset signal implies voltage or current applied to actuators 100A, 100B.

(b) Relative height δ is directly detected from error signal Sp reproduced by magnetic head $B_{j1}$ (step S15).

Although a relative height is detected using magnetic head $B_{j1}$ a similar effect can be obtained by using magnetic head $B_{j1+2c}$ (c is an integer).

(IV) Relative height adjustment is carried out by one of the following methods according to information concerning relative height δ detected by the above-described step S15.

(1) An offset signal corresponding to the displacement of −δ is applied only to actuator 100B, whereby magnetic head group BT is displaced by −δ (step S17). Here, actuator 100A to which magnetic head group AT is installed is not displaced. This method is effective especially when actuators 100A and 100B are driven independently by independent driving circuit, for example, as shown in the above described FIGS. 39 to 41.

(2) Offset signals corresponding to the displacement of δ/2 and −δ/2 are applied to actuators 100A and 100B, respectively, whereby magnetic head groups AT and BT are displaced by δ/2 and −δ/2, respectively, in opposite directions (step S17). This method is effective especially when actuators 100A and 100B are driven simultaneously to be displaced respectively in opposite directions by the same driving circuit, for example, as shown in the above described FIGS. 42 to 46.

By repeating the above-described reproduction operations (III) and (IV) several times for adjusting the head group height, the detection error of the relative height of the magnetic head groups is averaged, and the relative height δ of magnetic head groups AT and BT is gradually converged to zero. When adjustment of the relative height is completed (step S16), the offset signals applied to actuators 100A and 100B at that time are stored (step S18). These offset signals are called the optimum offset signals.

Then, under the state that the above-described optimum offset signals are constantly applied to actuators 100A and 100B, the tape is rewound (step S18), and erasing a general signal recording operation is carried out erasing the above-described recording tracks (step S20). When a general signal recording operation is carried out, the tape speed or the speed of rotation of the magnetic head group is reset to a general speed (S19).

Figure 12:
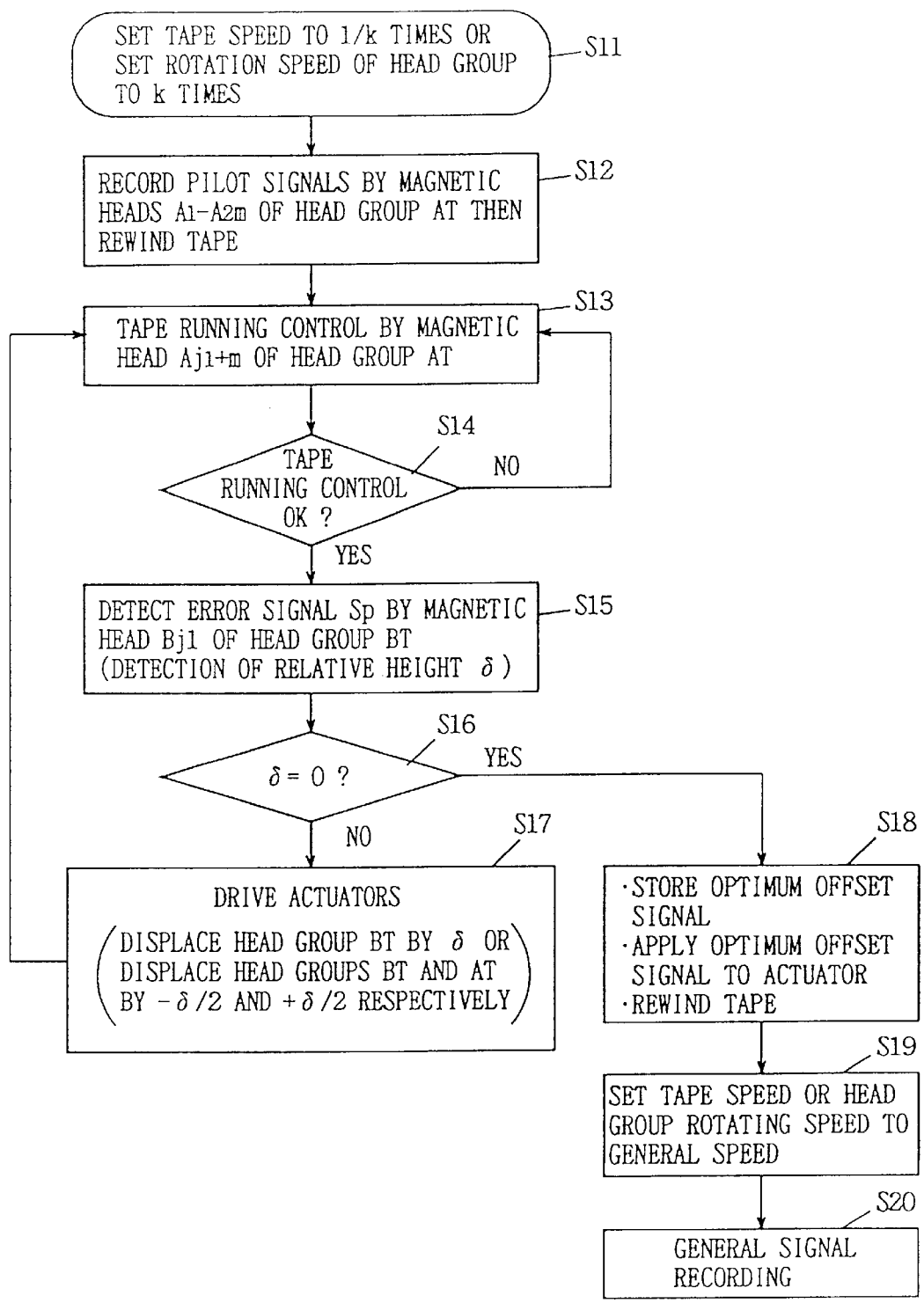
FIG. 12 is a flow chart showing a method of adjusting the head height according to a second embodiment.
Figure 17:
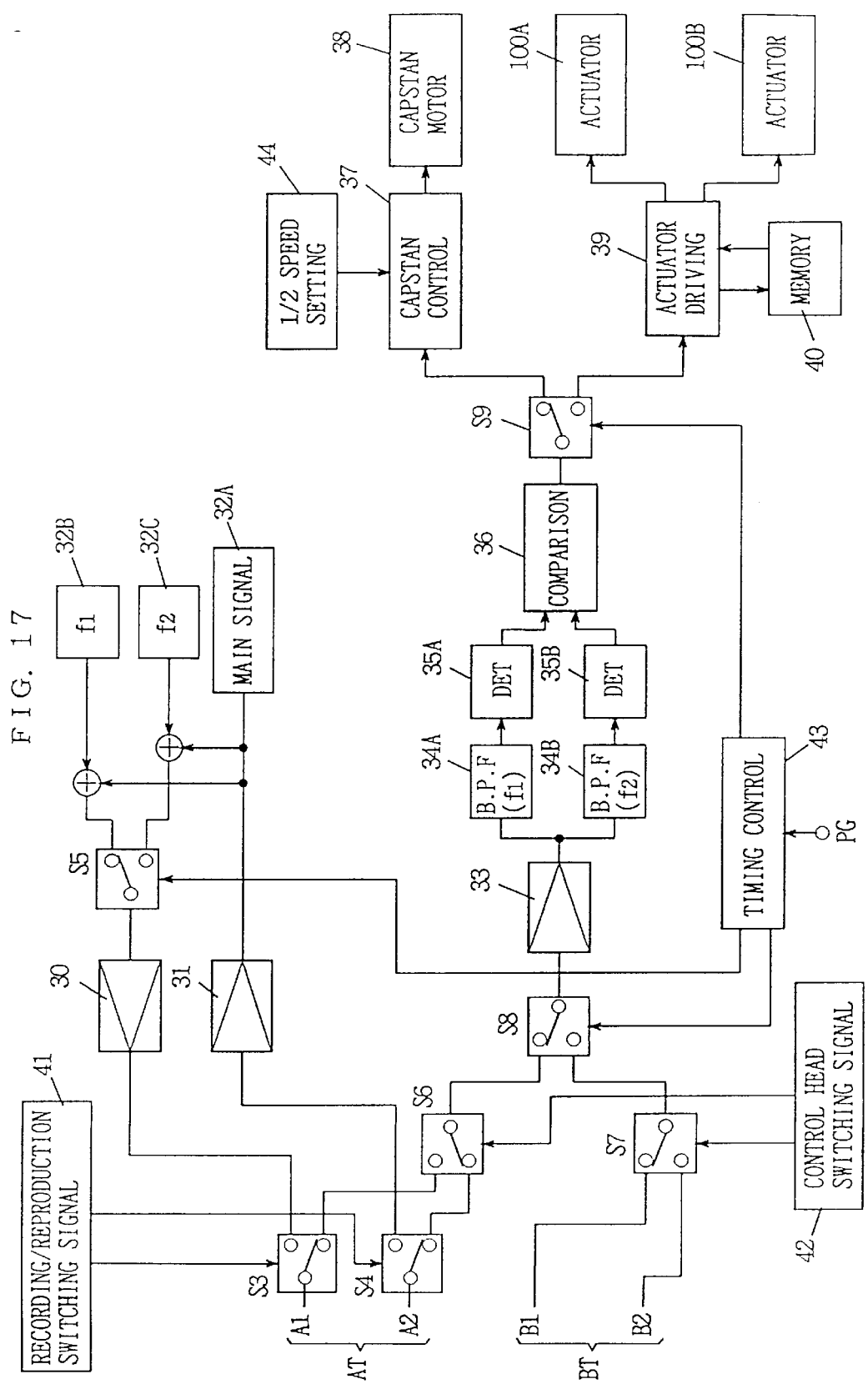
FIG. 17 is a block diagram of a head height adjusting apparatus according to the second embodiment.

FIG. 17 is a block diagram of a circuit connected to magnetic head groups AT and BT according to the second embodiment. FIG. 17 shows an embodiment wherein magnetic head group AT includes two magnetic heads $A_1$ and $A_2$ and magnetic head group BT includes two magnetic heads $B_1$, $B_2$. The operation of the circuit of FIG. 17 will be described along with the flow chart of FIG. 12. In the present embodiment, n=2, k=2, m=1, j1=1.

(I) The tape speed is set to ½ times that of the general recording/reproducing operation by a ½ speed setting circuit 44 and a capstan control circuit 37 (step S11). The number of rotations of rotary drum 1 may be set to two times that of a general recording/reproducing operation.

(II) Switches $S_3$ and $S_4$ are set to a recording mode by a recording/reproduction switching signal from recording/reproduction switching signal generation circuit 41 (step S12). Two types of pilot signals $f_1$ and $f_2$ generated by pilot signal generators 32B and 32C are superimposed on a main signal from a main signal source 32A, and then recorded on a magnetic tape by magnetic head $A_1$ via a switch $S_5$, an amplifier 30, and a switch $S_3$.

Pilot signals $f_1$ and $f_2$ are switched by switch $S_5$ according to a timing signal in synchronization with one rotation of rotary drum 1 produced by timing control circuit 43 to be selectively recorded alternately for every one scanning operation by magnetic head $A_1$. Magnetic head $A_2$ records the main signal supplied via an amplifier 31 and switch $S_4$.

(III) Switches $S_3$ and $S_4$ are set to a reproduction mode by recording/reproduction switching signal from recording/reproduction switching signal generation circuit 41 (step S13). Switches S6 and S7 are switching-controlled by a control head switching signal from a control head switching signal generation circuit 42, whereby a head for carrying out running control (in this case, magnetic head $A_2$) and a head for carrying out detection of a relative height (in this case, magnetic head $B_1$) are respectively selected. Switches $S_8$ and $S_9$ are switch-controlled by a timing signal in synchronization with half rotation of rotary drum 1 obtained from timing control circuit 43, and a tape running control and a relative height detection are carried out when magnetic head $A_2$ scans a tape and magnetic head $B_1$ scans a tape, respectively.

(III-i) A signal reproduced by magnetic head $A_2$ is amplified by an amplifier 33 via switches $S_4$, $S_6$ and $S_8$, and then has its level detected for every frequency component of pilot signals $f_1$ and $f_2$ by bandpass filters 34A and 34B and detectors 35A and 35B. These results are compared by a comparator 36, whereby tape running control is carried out by a capstan control circuit 37 and a capstan motor 38 according to the polarity and level of the difference signal provided from comparator 36 (step S13).

(III-ii) A signal reproduced by magnetic head $B_1$ is amplified by amplifier 33 via switches $S_7$ and $S_8$, and has its level detected for every frequency components of pilot signals $f_1$ and $f_2$ by bandpass filters 34A, 34B and detectors 35A, 35B. These results are compared by comparator 36 (step S15).

(IV) According to an error signal Sp (relative height δ) detected by comparator 36, actuators 100A and 100B are displaced by actuator driving circuit 39 (step S17).

The above operations of (III) and (IV) are repeated several times. The offset signal (optimum offset signal) when the relative height δ becomes 0 (step S16) is stored in memory 40, and this optimum offset signal is applied to actuators 100A and 100B (step S18).

According to the second embodiment of the present invention, a plurality of tracks which become the reference for head group height adjustment are formed, and the two sets of magnetic head groups sequentially scan the plurality of tracks to detect and adjust the relative height. Therefore, the detection error of the relative height is averaged, and detection error of the relative height caused by unstable tape/head contact and unstable positioning of the tape can be reduced.

A third embodiment of the present invention will be described hereinafter. The third embodiment differs from the above-described second embodiment in the usage of magnetic heads carrying out signal recording and a part of detecting method of relative height δ. The other operations are similar to those of the second embodiment, and the descriptions will not be repeated.

(I) The tape speed $V_{t2}$ is set to 1/k times the speed $V_t$ of a general recording and reproducing operation, or the speed of rotation $V_{h2}$ of the head is set to k times the speed $V_h$ of a general recording and reproducing operation.

Figure 18:
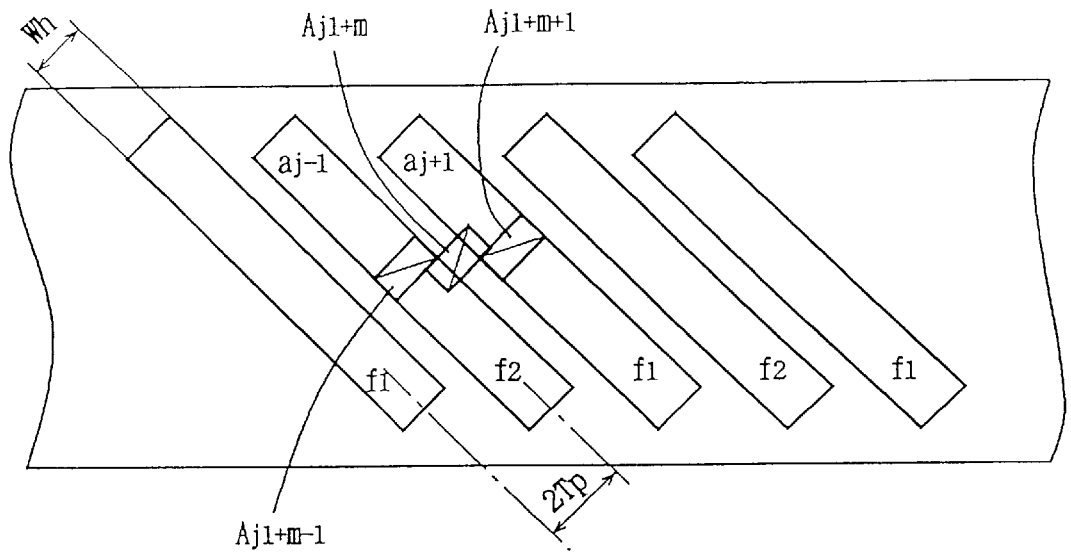
FIGS. 18 and 19 are schematic diagrams for describing a method of adjusting the head height according to a third embodiment.

(II) Signal are recorded by every other magnetic head $A_1$, $A_3$, $A_5$, . . . , $A_{2m-1}$ out of magnetic heads $A_1$~$A_{2m}$ to form tracks $a_1$, $a_3$, $a_5$, . . . , $a_{2m-1}$, $a_1$, . . . FIG. 18 is a part of a track pattern thereof, wherein each track has a track width of Wh and a track pitch of 2 Tp. The track pattern is similar to that of the above-described first embodiment. For example, pilot signals $f_1$, $f_2$, $f_1$, . . . of different frequencies are cyclically recorded on respective tracks $a_1$, $a_3$, $a_5$, . . . , $a_{2m-1}$, $a_1$, . . . . A pilot signal may be superimposed on a main signal to be recorded.

(III-i) Tape running control is carried out by capstan control so that magnetic head $A_{ji+m}$ (1≦j1, j1+m≦n) reproduces equally pilot signals $f_2$ and $f_1$ of two tracks $a_{j-1}$ and $a_{j+1}$ having a distance of 2 Tp therebetween. This state is shown in FIG. 18.

Figure 19:
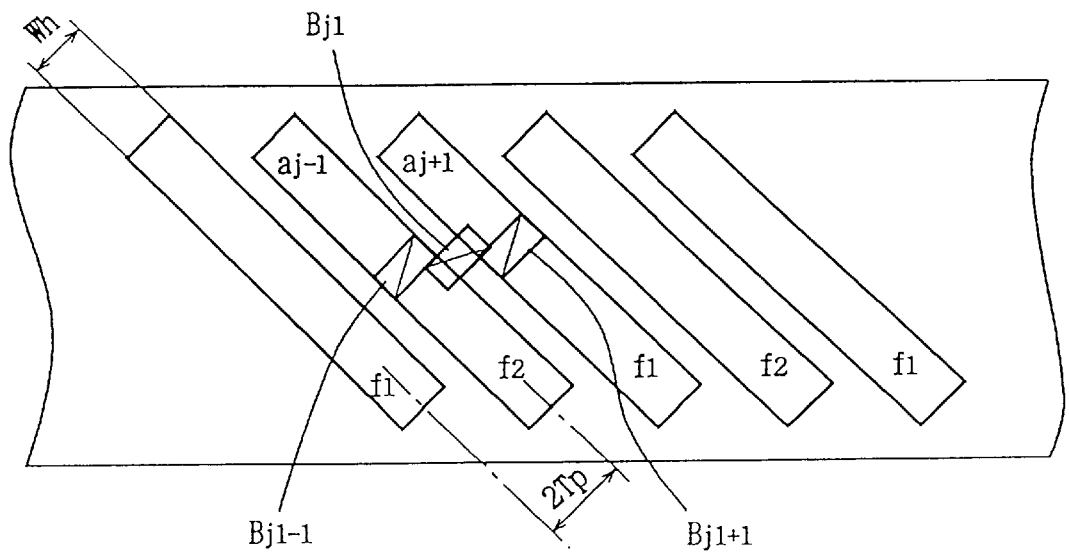

(III-ii) Signal are reproduced by a magnetic head of magnetic head group BT under the state where tape running control is carried out in the above described manner. Here, the used magnetic head is either magnetic head $B_{j1}$ or magnetic head $B_{j1+1}$ . The following operation differs depending on used magnetic head. FIG. 19 shows the position relationship between tracks and a magnetic head group BT. The operation also applies for magnetic head $B_{j1+2c}$ and magnetic head $B_{j1+(2c+1)}$ (c is an integer).

(III-ii-a) When magnetic head $B_{j1}$ is used:
When the relative height δ is 0, magnetic head $B_{j1}$ scans a locus exactly identical to the scanning locus of magnetic head $A_{j1+m}$. Therefore, pilot signals $f_2$ and $f_1$ of tracks $a_{j-1}$ and $a_{j+1}$ are reproduced equally, resulting in an error signal Sp of 0. Therefore, relative height δ can be detected from error signal Sp according to a procedure similar to that of the above-described second embodiment.

(III-ii-b) When magnetic head $B_{j1+1}$ is used:

When the relative height δ is 0, the center of the scanning locus of magnetic head $B_{j1+1}$ coincides with the center of track $a_{j+1}$, and the reproduced output of magnetic head $B_{j1+1}$ takes a maximum value. Therefore, relative height δ can be detected from the reproduced output level of magnetic head $B_{j1+1}$, according to a procedure similar to that of the above-described first embodiment. The succeeding operation and effects are similar to those of the above-described second embodiment, and their description will not be repeated.

Fourth to eighth embodiments of the present invention will be described hereinafter. According to these embodiments, time dependent deviation of relative height can be corrected in a general signal recording operation after the relative height is adjusted by the above-described first to third embodiments. For example, this time dependent deviation of relative height is generated due to time dependent change in the actuator itself even if a constant offset signal (a constant voltage or current) is supplied to the actuator.

Figure 20:
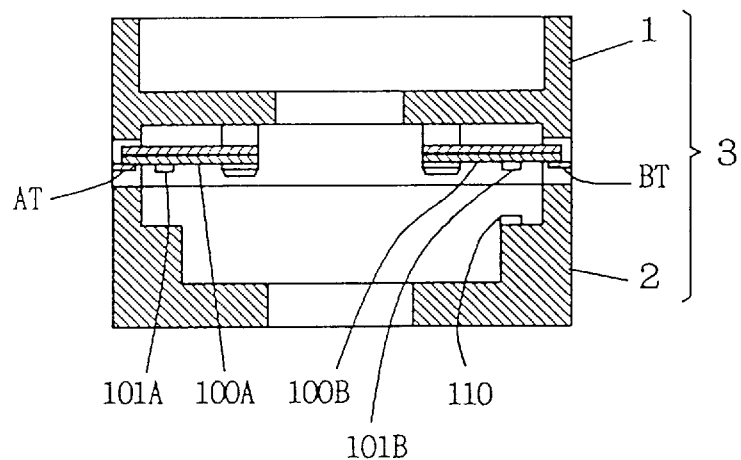
FIG. 20 is a sectional view schematically showing a rotary drum used in 4–8th embodiments.

FIG. 20 is a sectional view schematically showing a drum apparatus 3 of these embodiments. Magnetic head groups AT and BT include a face-to-be-detected 101A and a face-to-be-detected 101B, respectively, and at least one sensor for detecting the height of the above-described faces-to-be-detected is installed. Referring to FIG. 20, faces-to-be-detected 101A and 101B are provided at the bottom surface of actuators 100A and 100B, respectively. The sensor may be positioned at the fixed drum side, the rotary drum side or outside the drum apparatus. A detection method by the sensor may be any known method such as an electrostatic capacitance method, eddy current method, or optical method. As an example of this sensor, an electrostatic capacitance sensor 110 is arranged at the fixed drum 2 side in FIG. 20. Electrostatic capacitance sensor 110 sequentially faces the faces-to-be-detected 101A and 101B, whereby electrostatic capacitances therebetween are detected to obtain the height of the faces-to-be-detected. The faces-to-be-detected 101A and 101B are formed of a electro-conductive material such as aluminum or copper.

Figure 21:
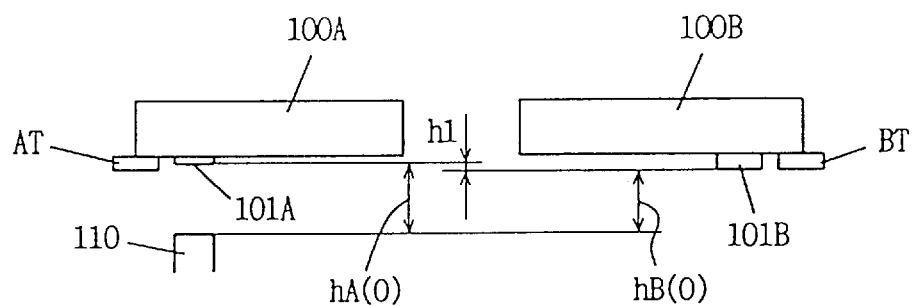
FIG. 21 is a schematic diagram showing the relationship between a sensor and the height of a face-to-be-detected.
Figure 22:
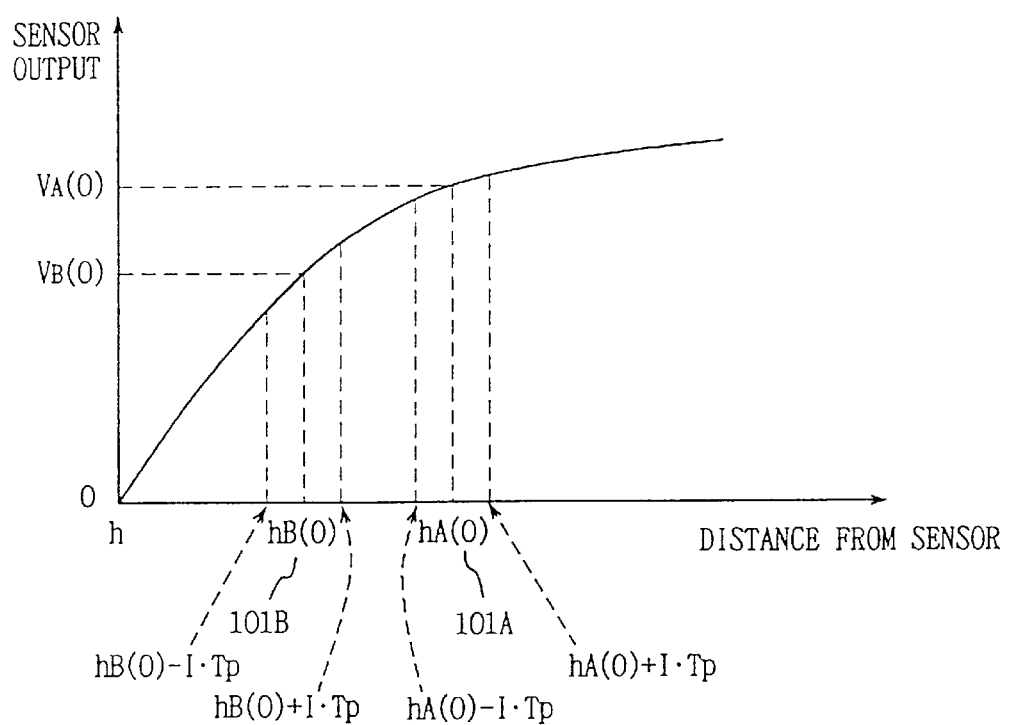
FIG. 22 is a graph showing displacement-output characteristics of a sensor.

It is assumed that the height between faces-to-be-detected 101A and 101B differs just by hi as shown in FIG. 21 when the relative height adjustment in first to third embodiments is completed. Here, the distance HA(0) and HB(0) of the faces-to-be-detected 101A and 101B with respect to sensor 110 differ from each other, and the corresponding sensor outputs of VA(0) and VB(0) also differ from each other. It is assumed that the displacement-output characteristics of sensor 110 is nonlinear as shown in FIG. 22.

A fourth embodiment will be described specifically with reference to the above description. This embodiment is applicable to the case where the relative height has been adjusted by a method of relative height adjustment according to the above-described first to third embodiments or other methods. It is to be noted that the present embodiment is applicable to the case where actuators 100A and 100B are driven independently by independent driving circuits, for example, as shown in the above described FIGS. 39 to 41.

First, sensor outputs VA(0) and VB(0) with respect to the faces-to-be-detected 101A and 101B are respectively detected and stored when the relative height adjustment is completed. At a subsequent general signal recording operation, actuators 100A and 100B are controlled so that sensor outputs VA' and VB' with respect to the faces-to-be-detected 101A and 101B match VA(0) and VB(0), respectively.

Figure 23:
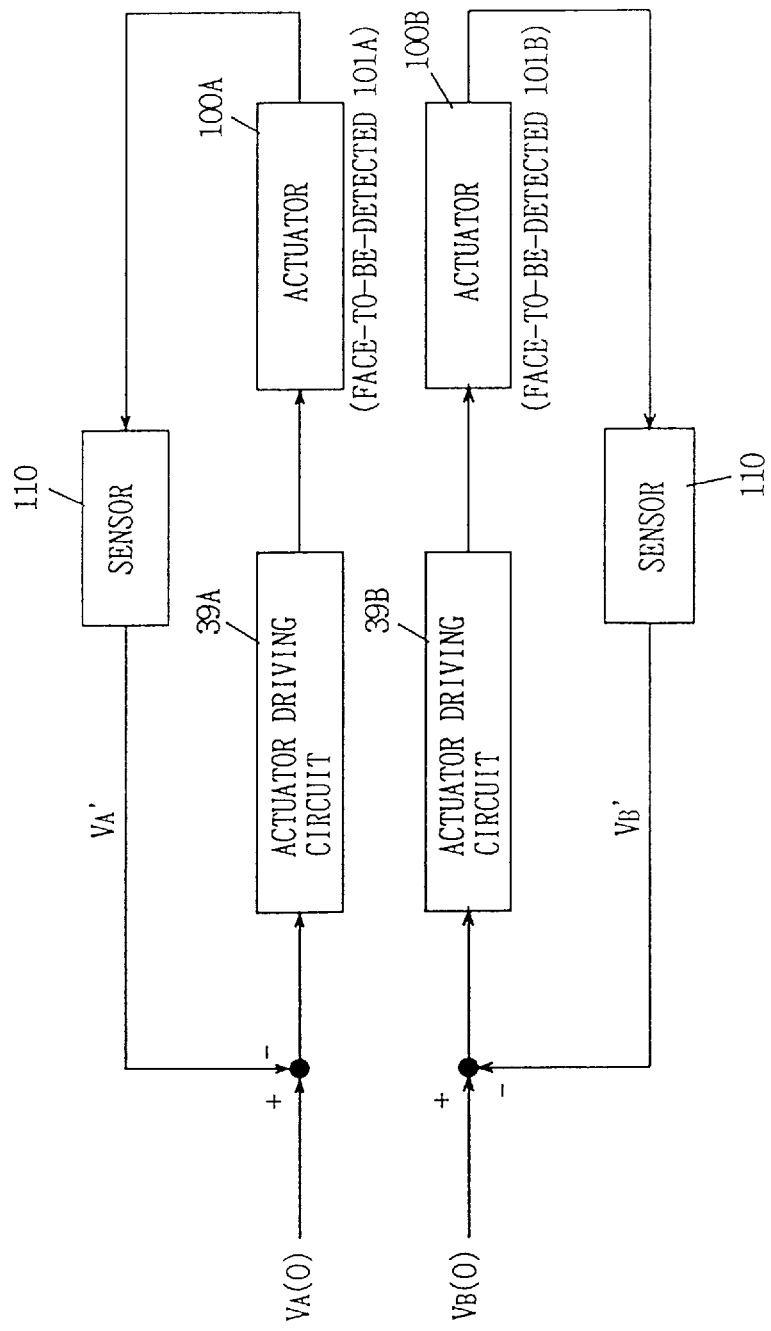
FIG. 23 is a block diagram showing a head height adjusting apparatus according to the fourth embodiment.

FIG. 23 is a block diagram for realizing this operation. Referring to FIG. 23, outputs VA' and VB' of sensor 110 with respect to the faces-to-be-detected 101A and 101B are respectively compared with target values VA(0) and VB(0), whereby actuator driving circuits 39A and 39B are controlled by the results thereof. By this operation, the height of the faces-to-be-detected 101A and 101B can be maintained constantly to HA(0) and HB(0). More specifically, the relative height of magnetic head groups AT and BT can be corrected to 0 even in a general signal recording operation.

A fifth embodiment of the present invention will be specifically described hereinafter. This embodiment is also applicable to the above-described second or third embodiments. Magnetic head group AT includes n (n is at least 2) magnetic heads $A_1, A_2, \ldots, A_n$ and magnetic head group BT includes n magnetic heads $B_1, B_2, \ldots, B_n$. The present embodiment is applicable to the case where actuators 100A and 100B are driven simultaneously by the same driving circuit (for example, as shown in the above described FIGS. 42 to 46), and the case where actuators 100A and 100B are driven independently by independent driving circuits (for example, as shown in the above described FIGS. 39 to 41. In the former case, actuators 100A and 100B are used to be displaced in opposite directions.

Figure 24:
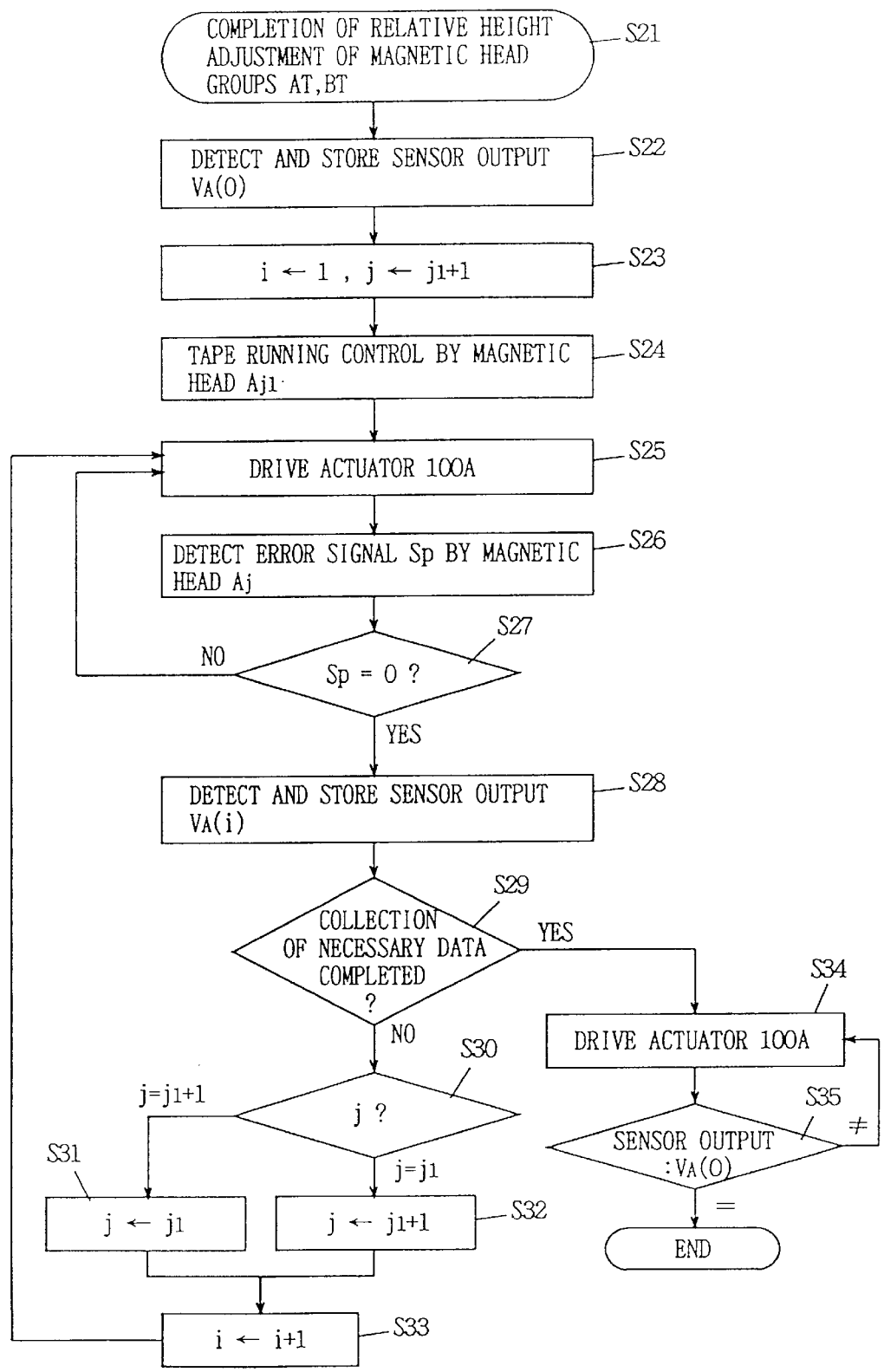
FIG. 24 is a flow chart of a method of adjusting the head height according to a fifth embodiment.

A method of calibrating a displacement-output curve of sensor 110 will be described along the flow chart of FIG. 24. Although a method of calibrating the characteristics of sensor 110 is described with respect to a face-to-be-detected 101A, the description also applies to a face-to-be-detected 101B.

(I) Sensor output VA(0) is detected when the relative height adjustment of magnetic head groups AT and BT is completed (step S21) to be stored (step S22).

Figure 25:
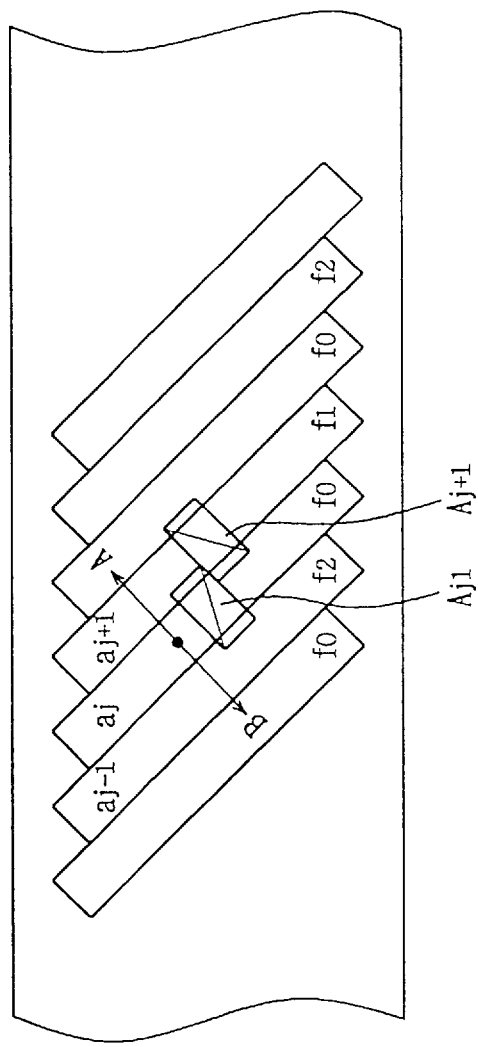
FIG. 25 is a schematic diagram for describing the method of adjusting the head height according to the fifth embodiment.
Figure 26:
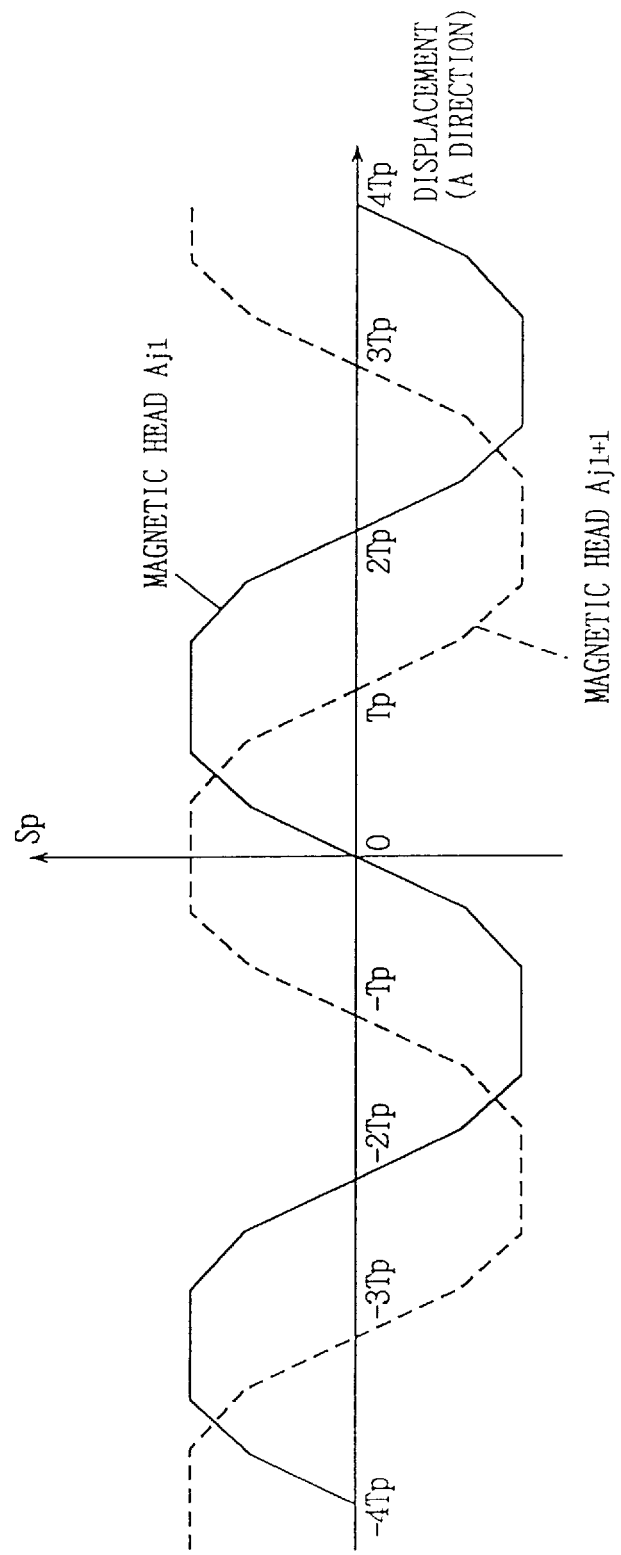
FIG. 26 is a graph showing the relationship between the displacement amount of a magnetic head group and an error signal.

(II) Tape running control is carried out by magnetic head $A_{j1}$ of magnetic head group AT according to a procedure similar to those of the above-described second or third embodiments (steps S23 and S24). This state is shown in FIG. 25. When actuator 100A is driven under this state (step S25), error signals Sp reproduced by magnetic heads $A_{j1}$ and $A_{j1+1}$ vary according to displacement of magnetic head group AT as shown by the solid line and dotted line in FIG. 26. An error signal level with respect to each magnetic head is normalized at the maximum level of each magnetic head in FIG. 26. More specifically, error signal Sp becomes 0 at every displacement of magnetic head $A_{j1}$ to $2I_1 \cdot Tp$ and magnetic head $A_{j1+1}$ to $(2I_1+1) \cdot Tp$. Here, $I_1$ is an integer.

(III) When magnetic head group AT scans a magnetic tape, actuator 100A is driven in the direction of A in FIG. 25 (step S25). When error signal Sp obtained from magnetic head $A_{j1+1}$ becomes 0 (steps S26 and S27), actuator 100A is caused to maintain its height. Under this state, the face-to-be-detected 101A (actuator 100A) rotates to a position facing sensor 110. Here, output VA(i) of sensor 110 is detected and stored (step S28). Then, the next operation of (IV) is carried out. VA(i) represents a sensor output when magnetic head group AT is displaced by $i \cdot Tp$ in the direction of A.

(IV) When magnetic head group AT scans the magnetic tape, actuator 100A is driven again in the direction of A (step S25). When error signal Sp obtained from magnetic head $A_{j1}$ becomes 0 (steps S26 and S27), actuator 100A is caused to maintain its height. Under this state, the face-to-be-detected 101A (actuator 100A) rotates to a position facing sensor 110. Here, output VA(i) of sensor 110 is detected and stored. Then, the above operation of (III) is carried out.

(V) The above operations of (III) and (IV) are repeated, and the required number I of VA(i) are obtained (step S29). Then, actuator 100A is displaced to obtain a sensor output VA(0) (steps S34 and S35).

(VI) Tape running control is carried out by magnetic head $A_{j1}$ of magnetic head group AT at a state where magnetic head group AT returns to the height at the completion of the relative height adjustment according to the operation of (V). Then, actuator 100A is driven in the direction of B in FIG. 25, and the operations similar to the above operations of (III) and (IV) are repeated. After obtaining the required numbers I of VA(i), actuator 100A is displaced so that a sensor output of VA(0) is obtained.

Figure 27:
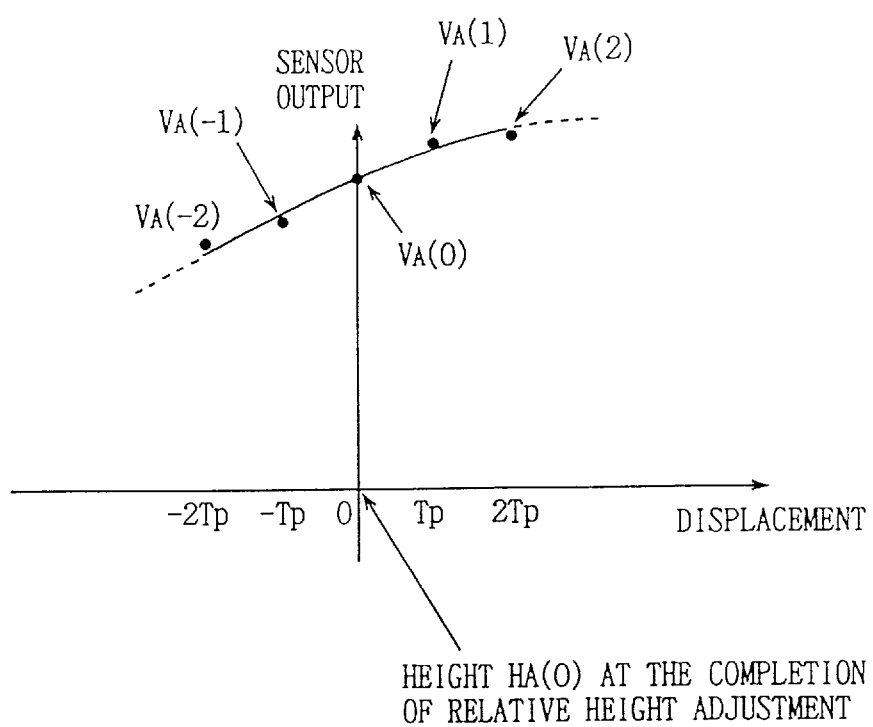
FIG. 27 is a displacement-output calibration curve of the sensor of the fifth embodiment.

(VII) Using the above-obtained VA(i), a displacement-output curve of sensor 110 with respect to the face-to-be-detected 101A is calibrated. FIG. 27 shows an example thereof. VA(i) which are the discrete data may be interpolated by an appropriate method such as polynomial approximation.

According to the above-described operations of (I)·(VII), the sensor output is calibrated with respect to displacement of $-I \cdot Tp \cdot +I \cdot Tp$ of magnetic head group AT (face-to-be-detected 101A) with the height HA(0) at completion of the relative height adjustment as the reference. According to a similar method, displacement-output curve of the sensor 110 with respect to magnetic head group BT (face-to-be-detected 101B) can be calibrated with the height HB(0) at completion of the relative height adjustment as the reference. Although sensor outputs are detected when error signals Sp become zero of magnetic heads $A_{j1}$ and $A_{j1+1}$ in the above description, sensor outputs when the reproduced outputs of magnetic heads $A_{j1}$ and $A_{j1+1}$ are maximum may be detected when applied to the above-described third embodiment. Also, a combination thereof may be used.

Figure 28:
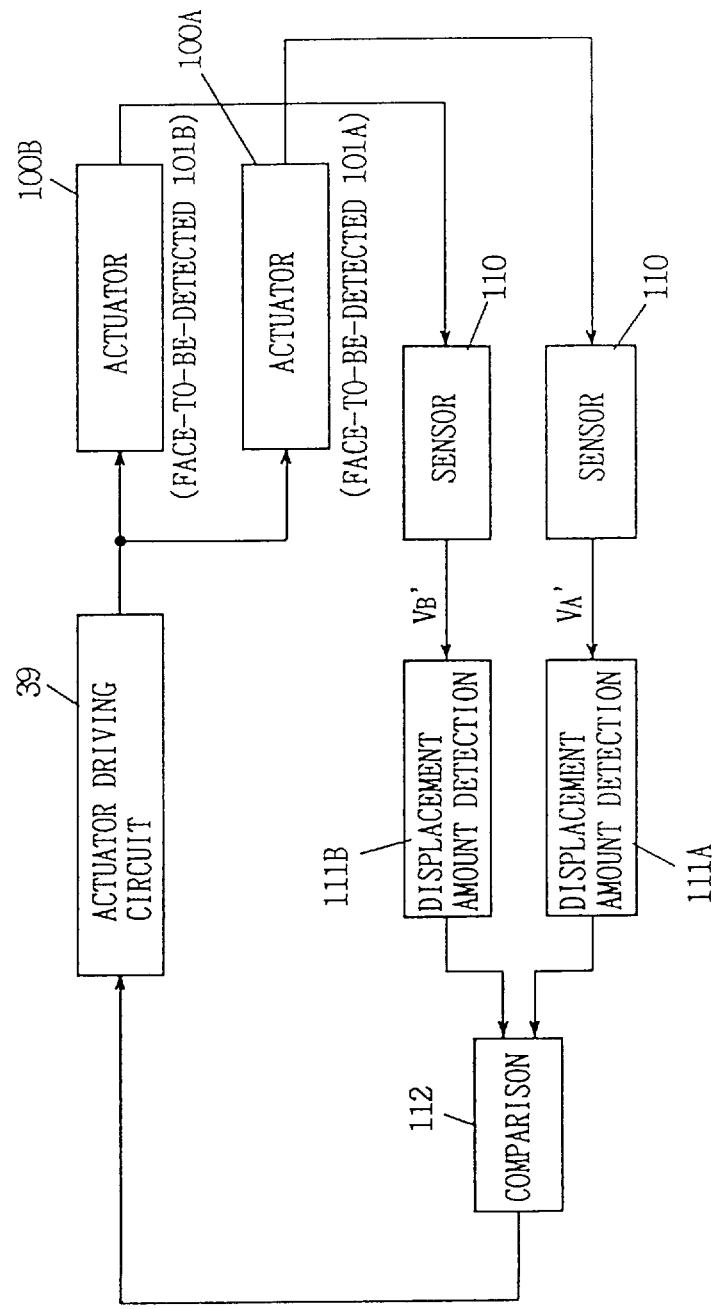
FIG. 28 is a block diagram of the head height adjusting apparatus according to the fifth embodiment.

Detection and correction of relative height deviation which is time dependent in a general signal recording operation according to the fifth embodiment of the present invention will be described with reference to the block diagram of FIG. 28. Referring to FIG. 28, displacement amount detection circuits 111A and 111B converts the sensor outputs into displacement amounts with the height at completion of the relative height adjustment as the reference according to the above-obtained sensor displacement-output curve.

In a general signal recording operation, the height of the faces-to-be-detected 101A and 101B is detected by sensor 110. Displacement amounts of magnetic head groups AT and BT are detected respectively by displacement amount detection circuits 111A and 111B from sensor outputs VA' and VB' with respect to face-to-be-detected 101A (magnetic head group AT) and face-to-be-detected 101B (magnetic head group BT). By comparing the obtained respective displacement amounts of magnetic head groups AT and BT by means of comparator 112 to obtain a difference thereof, relative height deviation of magnetic head groups AT and BT according to time depending changes is detected.

Accordingly, by controlling actuators 100A and 100B so that the above described difference of displacement amounts equals 0, the offset signals applied to actuators 100A and 100B are corrected, and time dependent deviation of the relative height of magnetic head groups AT and BT is corrected. Although actuators 100A and 100B are shown to be driven in opposite directions by the same driving circuit 39 in FIG. 28, the basic concept thereof is similar in the case where only actuator 100B is driven.

A sixth embodiment of the present invention will be described hereinafter. This embodiment is applicable to the above-described first embodiment, and magnetic head groups AT is formed of one magnetic head $A_1$ and magnetic head group BT is formed of one magnetic head $B_1$. Similar to the above-described fifth embodiment, the present embodiment is applicable to the case where actuators 100A and 100B are driven simultaneously by the same driving circuit (for example, as shown in the above described FIGS. 42 to 46), and the case where actuators 100A and 100B are driven independently by independent driving circuits (for example, as shown in the above described FIGS. 39 to 41). In the former case, actuators 100A and 100B are driven to be displaced in opposite directions.

Figure 29:
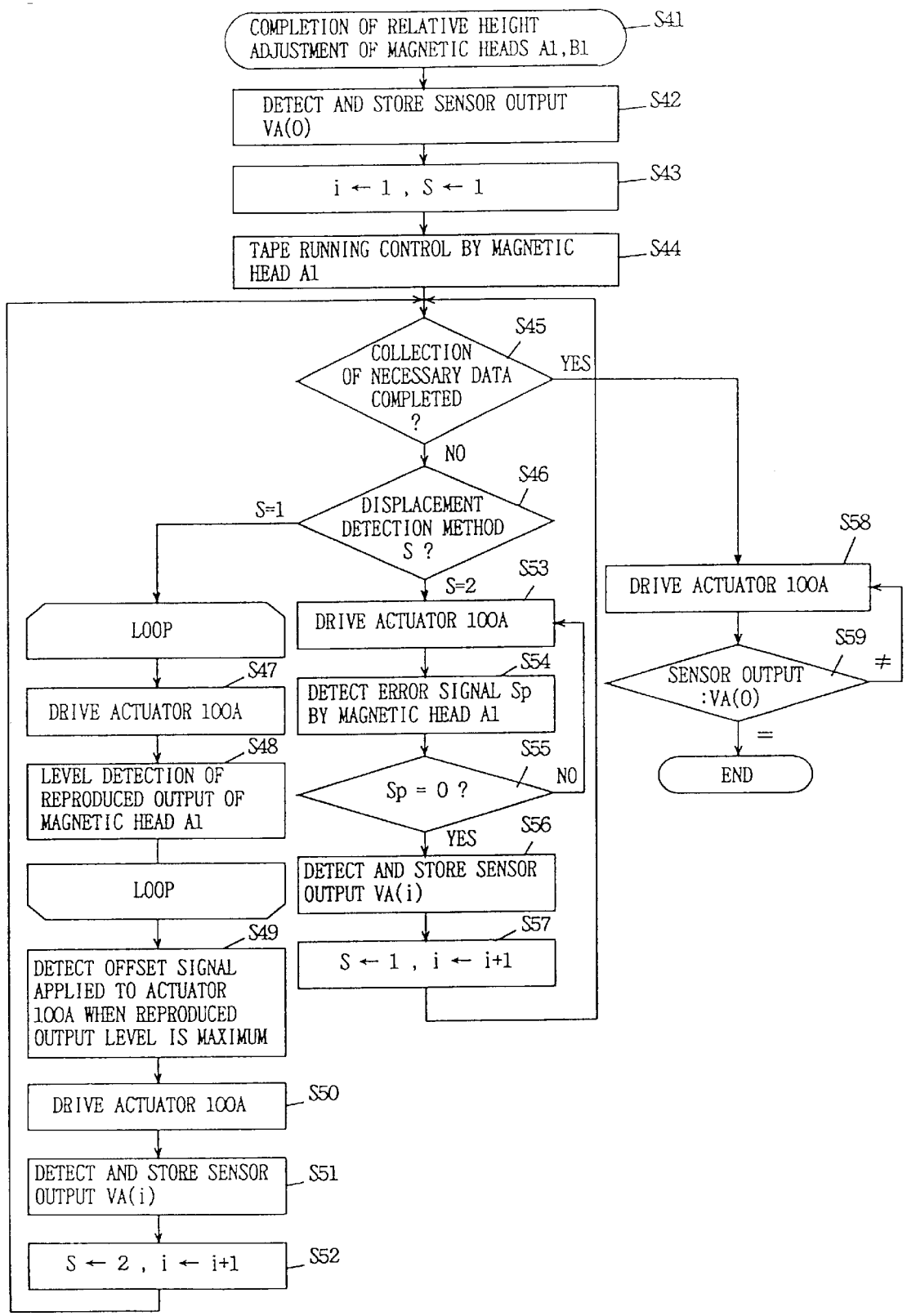
FIG. 29 is a flow chart of a method of adjusting the head height according to a sixth embodiment.

Detection and correction method of time dependent deviation of relative height in a general signal recording operation are similar to those of the block diagram (FIG. 28) of the fifth embodiment. Therefore, calibration of a displacement-output curve of sensor 110 will only be described according to the flow chart of FIG. 29.

(I) First, sensor output VA(0) with respect to the face-to-be-detected 101A after adjustment of the relative height of magnetic heads $A_1$ and $B_1$ is completed (step S41) is detected and stored (step S42).

Figure 30:
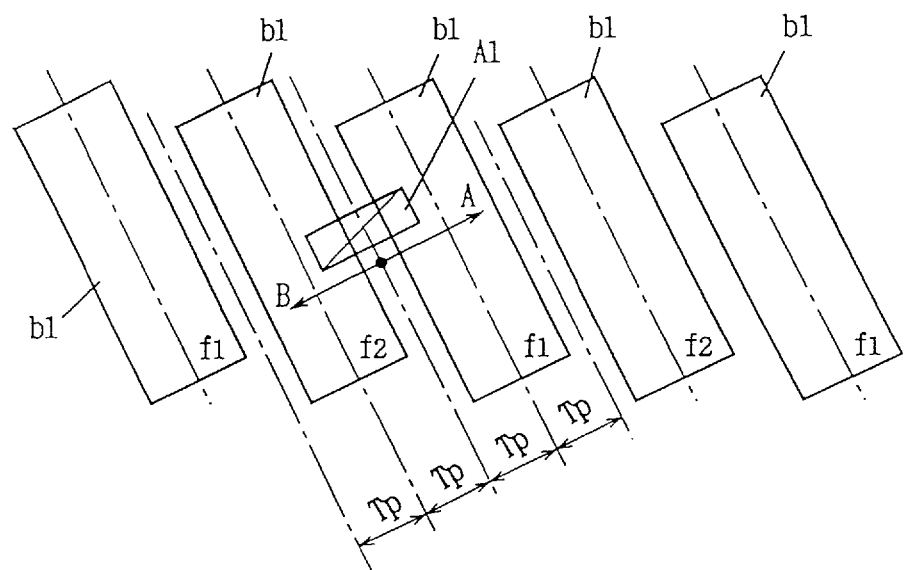
FIG. 30 is a schematic diagram for describing a method of adjusting the head height according to the sixth embodiment.
Figure 31:
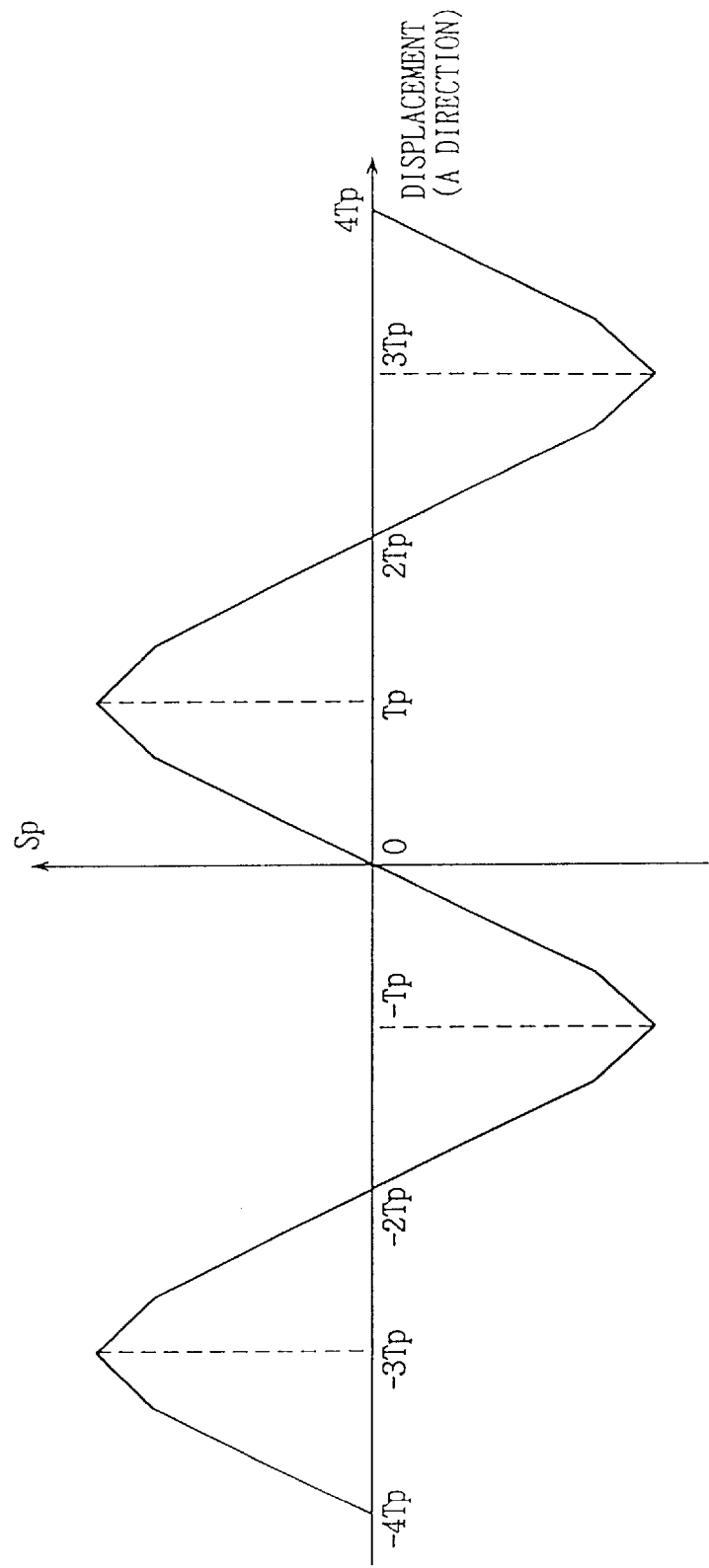
FIG. 31 is a graph showing the relationship between the displacement amount of the magnetic head and an error signal.

(II) According to a method similar to that of the first embodiment, tape running control by magnetic head $A_1$ is carried out (steps S43–S44). This state is shown in FIG. 30. When actuator 100A is driven under this state, error signal Sp reproduced by magnetic head $A_1$ changes as shown in FIG. 31 according to displacement of magnetic head $A_1$. More specifically, error signal Sp becomes 0 for every displacement of magnetic head $A_1$ by $2I_1 \cdot Tp$, and the absolute value of error signal Sp becomes maximum for every displacement by $(2I_1+1) \cdot Tp$. Here, $I_1$ is an integer.

(III) When magnetic head $A_1$ scans the magnetic tape, actuator 100A is driven in the direction of A in FIG. 30 (step S47–step S48). According to a method similar to that of the first embodiment, the offset signal applied to actuator 100A is detected when error signal Sp obtained from magnetic head $A_1$ takes a maximum value (step S49). Then, the detected offset signal is applied to actuator 100A (step S50), and magnetic head $A_1$ is maintained at a height where error signal Sp becomes maximum.

Under this state, when the face-to-be-detected 101A (actuator 100A) rotates to a position facing sensor 110, output VA(i) of sensor 110 is detected and stored (step S51). Then, the following operation of (IV) is carried out. VA(i) represents a sensor output when magnetic head $A_1$ is displaced by $i \cdot Tp$ in the direction of A.

(IV) When magnetic head $A_1$ scans the magnetic tape, actuator 100A is driven in the direction of A again (step S53). When error signal Sp obtained from magnetic head $A_1$ becomes 0 (steps S54–S55), actuator 100A is maintained at that height. Under this state, the face-to-be-detected 101A (actuator 100A) rotates to a position facing sensor 110. Here, output VA(i) of sensor 110 is detected to be stored (step S56). Then, the above-described operation of (III) is carried out.

(V) The above operations of (III) and (IV) are repeated to obtain the required numbers of VA(i)s (step S45). Then, actuator 100A is displaced so that the sensor output of VA(0) is obtained (steps S58–S59).

(VI) Tape running control is carried out by magnetic head $A_1$ at a state where magnetic head $A_1$ returns to the height at the completion of relative height adjustment according to the above-described operation of (V). Then, actuator 100A is driven in the direction of B in FIG. 30, and the operations similar to the above-described operations of (III) and (IV) are repeated. After the required number of VA(i) are obtained, actuator 100A is displaced so that the sensor output becomes VA(0).

(VII) Using the obtained VA(i), a displacement-output curve of sensor 110 is calibrated with respect to the magnetic head $A_1$ (the face-to-be-detected 101A). The calibration method is similar to that of the fifth embodiment (FIG. 27).

According to a method similar to that described above, a sensor displacement-output curve with respect to magnetic head $B_1$ (the face-to-be-detected 101B) is calibrated.

A seventh embodiment of the present invention will be described. The present embodiment is applicable to the case where relative height adjustment is carried out according to the method described in the first and to third embodiments or other relative height adjustment methods. Similar to the fifth and sixth embodiments, the present embodiment is applicable to the case where actuators 100A and 100B are driven simultaneously by the same driving circuit (for example, as shown in the above described FIGS. 42 to 46), and the case where actuators 100A and 100B are driven independently by independent driving circuits (for example, as shown in the above described FIGS. 39 to 41). In the former case, actuators 100A and 100B are driven to be displaced in opposite directions.

Figure 32:
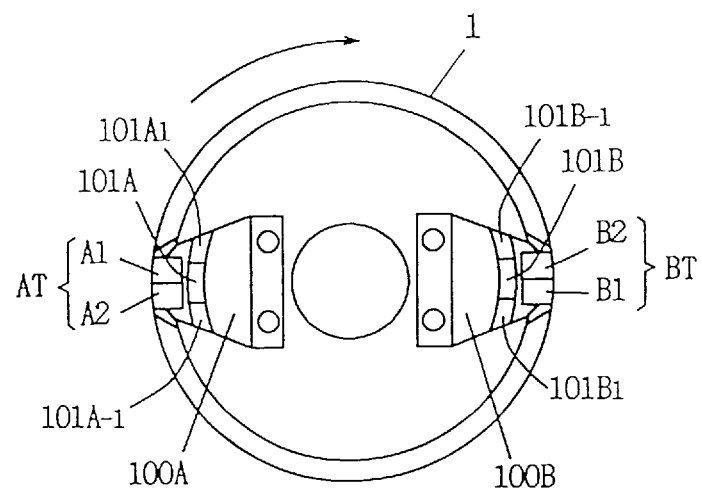
FIG. 32 is a bottom view of a rotary drum according to a seventh embodiment.
Figure 33:
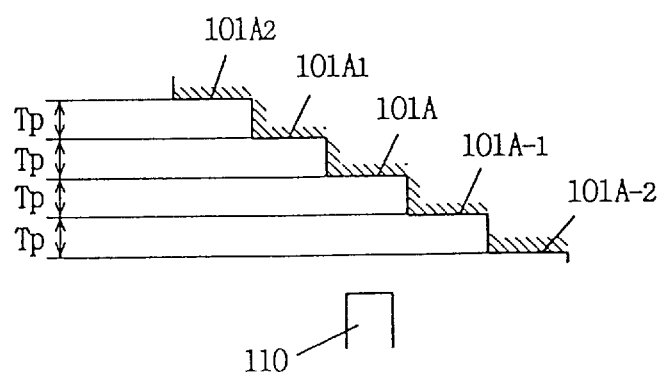
FIG. 33 is a schematic diagram showing the relationship of the height of a plurality of faces-to-be-detected according to the seventh embodiment.

FIG. 32 is a bottom view of a rotary drum 1 of the present embodiment. A face-to-be-detected 101A and a plurality of faces-to-be-detected $101A_i$ (i=–I·+I) are provided with predetermined differences in height at the bottom face of actuator 100A. FIG. 32 shows the case of I=1. The face-to-be-detected 10A is located at the center of these faces-to-be-detected. The above-mentioned differences in height may be determined according to the correcting accuracy of the relative height deviation. For example, it may be set to one track pitch (1Tp). FIG. 33 schematically shows the relation between faces-to-be-detected 101A and $101A_i$ in height for I=2.

The operation of the present embodiment will be described hereinafter. First, sensor output VA(0) with respect to the face-to-be-detected 101A and a sensor output VA(i) with respect to the face-to-be-detected $101A_i$ when the relative height adjustment for magnetic head groups AT and BT is completed is detected and then stored. Here VA(i) represents a sensor output at a position higher than the face-to-be-detected 101A by i·Tp.

Using the detected sensor output VA(i), a displacement-output curve of sensor 110 is calibrated with respect to the magnetic head group AT (face-to-be-detected 101A) according to a method similar to that of the fifth embodiment(FIG. 27). According to the above described method, a displacement-output curve of sensor 110 with respect to magnetic head group BT (face-to-be-detected 101B) is also calibrated. Because detection and correction method of the time dependent deviation in relative height in a general signal recording operation are similar to those described in the block diagram (FIG. 28) of the fifth embodiment, their description will not be repeated.

An eighth embodiment of the present invention will be described hereinafter. The present embodiment is applicable to the case where the relative height is adjusted according to the method described in the first to third embodiments or other relative height adjustment methods. Similar to the fifth to seventh embodiments, the present embodiment is also applicable to the case where actuators 100A and 100B are driven simultaneously by the same driving circuit (for example, as shown in the above described FIGS. 42 to 46), and the case where actuators 100A and 100B are driven independently by independent driving circuits (for example, as shown in the above described FIGS. 39 to 41). In the former case, actuators 100A and 100B are driven to be displaced in opposite directions.

Figure 34:
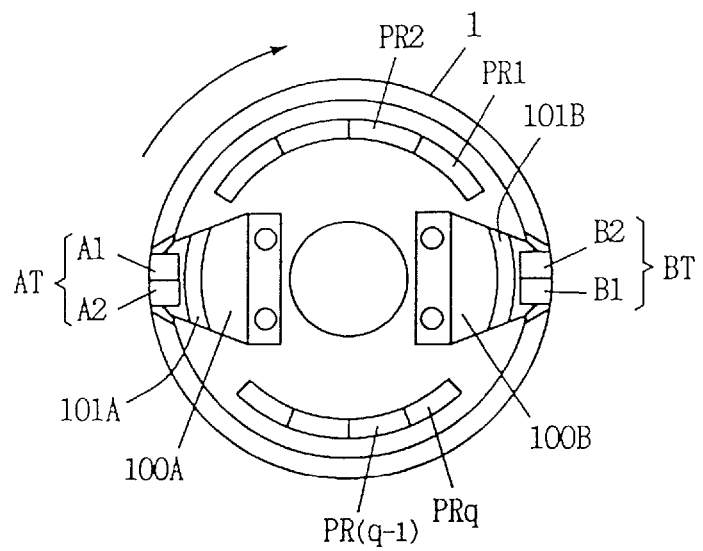
FIG. 34 is a bottom view of a rotary drum according to an eighth embodiment.

FIG. 34 is a bottom view of a rotary drum 1 of the present embodiment. A plurality of reference faces PR1, PR2, . . . , PRq are provided with predetermined differences in height in a region of rotary drum 1 where actuators 100A and 100B are not positioned. These differences in height can be determined according to the correction accuracy of the relative height deviation. For example, it may be set to 1 track pitch (1 Tp).

Figure 35:
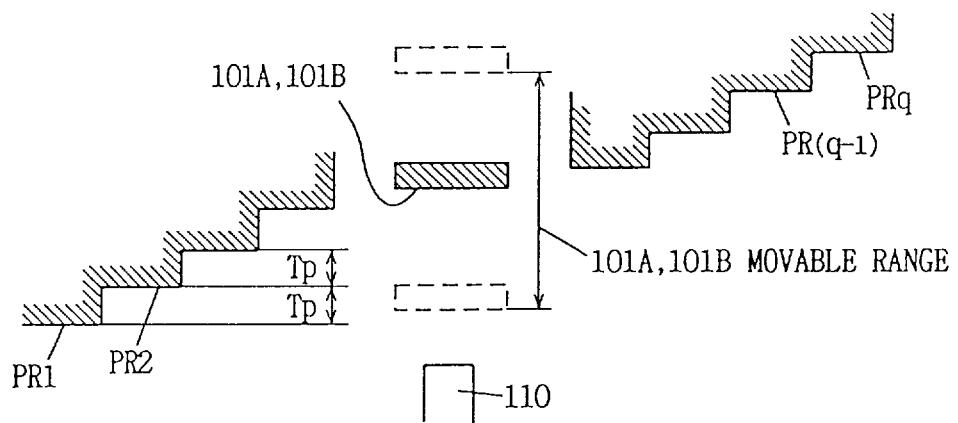
FIG. 35 is a schematic diagram showing the height relationship of a plurality of reference faces according to the eighth embodiment.
Figure 37:
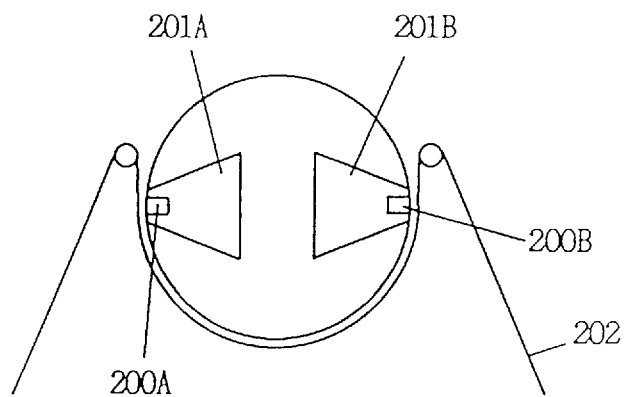
FIG. 37 is a bottom view of a rotary drum of a conventional rotary head type magnetic recording/reproduction apparatus.
Figure 38:
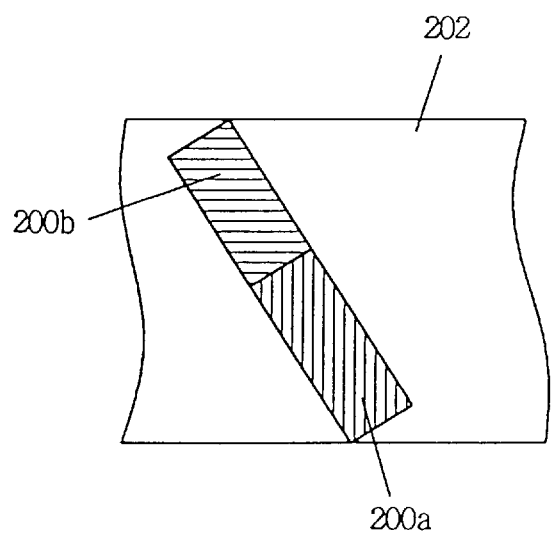
FIG. 38 is a schematic diagram showing the track pattern of a conventional magnetic head.

FIG. 35 schematically shows the height relation of reference faces PR1, PR2, . . . , PRq. It is to be noted that the height of reference face PR1 is set lower than the lowest height in the displaced range of faces-to-be-detected 101A and 101B by actually 100A and 100B, and the height of reference face PRq is set higher than the maximum height of the displaced range of the faces-to-be-detected 101A and 101B.

An operation of the present embodiment will be described hereinafter. In the present embodiment, a distance-output curve of sensor 110 is calibrated with the height of reference face PR1 as the reference from outputs of sensor 110 with respect to reference faces PR1, PR2, . . . , PRq. The method of calibration is similar to that of the above-described fifth embodiment (FIG. 27). The calibration is carried out for every detection of sensor outputs with respect to the faces-to-be-detected 101A and 101B.

Sensor outputs VA(0) and VB(0) with respect to faces-to-be-detected 101A and 101B when adjustment of relative height is completed are detected. These sensor outputs VA(0) and VB(0) are converted into heights HA(0) and HB(0) with respect to reference face PRI according to the above-described distance-output curve. Then, the difference between HA(0) and HB(0) (i.e., HA(0)–HB(0)) is obtained and then stored.

Detection and correction of time dependent deviation of the relative height in a general signal recording operation according to the eighth embodiment of the present invention will be described hereafter with reference to the block diagram of FIG. 36. In a general signal recording operation, sensor outputs VA' and VB' with respect to faces-to-be-detected 101A and 101B are detected. According to the above-described distance-output curve, these sensor outputs VA' and VB' are calculated into heights HA' and HB' with respect to reference face PR1. Detection of heights HA' and HB' is carried out by a distance detection circuit 113 in FIG. 36. The obtained heights HA' and HB' are compared by a comparator 112 to obtain a difference of HA'–HB'. By controlling actuators 100A and 100B so that the difference of HA'–HB' equals the difference HA(0)–HB(0) at the time of completion of relative height adjustment, time dependent deviation of relative height with respect to magnetic head groups AT and BT is corrected.

Thus, according to the present invention, a plurality of tracks which become the reference for relative height adjustment between two sets of magnetic head groups are formed. The magnetic head groups sequentially scan the plurality of tracks to detect and adjust the relative height. Therefore, the relative height of two sets of magnetic head groups commonly shared for recording and reproduction and mounted on actuators can be adjusted at high accuracy.

Furthermore, in a general signal recording operation after relative height adjustment, time dependent deviation of relative height between the magnetic head groups can be corrected. A track of a predetermined track width and track pitch can be formed during a signal recording operation. Therefore, a sufficient reproduced output that satisfies the specification of the apparatus can be obtained even when the track pitch is significantly narrow.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a rotary head type magnetic recording and reproducing apparatus including a rotary drum, and two magnetic head groups each having at least one magnetic head,; a method of adjusting the relative height in the track width direction between said two magnetic head groups, comprising the steps of:

recording cyclically in a predetermined order a plurality of types of predetermined signals differing for respective tracks on a traveling magnetic tape by at least one magnetic head in only one of said two magnetic head groups to form a plurality of tracks;

rewinding said magnetic tape after recording said signals;

reproducing said recorded signals and controlling the travel of said magnetic tape after said rewinding step so that said signals are simultaneously reproduced equally from two of said plurality of tracks by at least one magnetic head in a first one of said two magnetic head groups, the centers of the two tracks being spaced apart by two times the track pitch of the apparatus' general signal recording operation;

detecting information concerning the relative height between said two magnetic head groups from a signal reproduced by at least one magnetic head in a second one of said two magnetic head groups as the travel of said magnetic tape is controlled in said controlling step; and adjusting the relative height in the track width direction between said two magnetic head groups according to said detected information.

2. In a rotary head type magnetic recording and reproducing apparatus including a rotary drum, and a pair of magnetic heads[, and a pair of actuators provided on said rotary drum for displacing in a track width direction said pair of magnetic heads, respectively]; a method of adjusting the relative height in the track width direction between said pair of magnetic heads, comprising the steps of:

recording cyclically in a predetermined order a plurality of types of predetermined signals differing for respective tracks on a traveling magnetic tape by a first one of said magnetic heads to form a plurality of tracks, adjacent tracks having an unrecorded space therebetween, the unrecorded space spanning the length of the adjacent tracks;

rewinding said magnetic tape after recording said signals;

reproducing said recorded signals and controlling the travel of said magnetic tape after said rewinding step so that said recorded signals are simultaneously reproduced equally from two adjacent tracks out of said plurality of tracks by a second one of said magnetic heads, the unrecorded space being present between the two adjacent tracks;

detecting an output level of signals reproduced by said first magnetic head while sequentially applying a plurality of predetermined offset signals which displace said first magnetic head relative to said second magnetic head as the travel of said magnetic tape is controlled;

detecting an offset signal being applied when the output level of said signals reproduced by said first magnetic head becomes maximum as information concerning the relative height between said pair of magnetic heads; and adjusting the relative height between said first and second magnetic heads according to said detected information.

3. The method according to claim 2, wherein said apparatus includes a pair of actuators on said rotary drum for displacing in a track width direction said pair of magnetic heads, respectively and said step of adjusting the relative height includes the steps of:

obtaining from said detected offset signal an optimum offset signal to be applied to at least one of said pair of actuators to compensate for said relative height, and storing said optimum offset signal; and applying, during the apparatus' general recording operation, said stored optimum offset signal to at least one of said pair of actuators for compensating for the relative height between said magnetic heads.

4. The method according to claim 3, further including the steps of:

providing faces-to-be-detected at respective ones of said pair of magnetic heads;

providing at least one sensor for detecting the height of said faces-to-be detected;

storing outputs of said at least one sensor for respective ones of said faces-to-be-detected at completion of the step of adjusting the relative height between said pair of magnetic heads; and controlling independently said pair of actuators during the apparatus' general signal recording operation so that outputs of said sensor detected for respective ones of said faces-to-be-detected coincide with said stored sensor outputs.

5. The method according to claim 3, further including the steps of:

providing faces-to-be-detected at respective ones of said pair of magnetic heads;

providing at least one sensor for detecting the height of said faces-to-be detected;

storing outputs of said at least one sensor for respective ones of said faces-to-be-detected at completion of the step of adjusting the relative height between said pair of magnetic heads;

for respective ones of said faces-to-be-detected, storing outputs of said at least one sensor when the magnetic head corresponding to the face-to-be-detected is displaced by an integral multiple of a track pitch in the apparatus' general signal recording from the height at completing adjustment of the relative height;

for respective ones of said faces-to-be-detected, calibrating a displacement-output curve of said sensor according to the stored sensor outputs, with the height of the face-to-be-detected at completion of the relative height adjustment as the reference;

for respective ones of said faces-to-be-detected, converting, during the apparatus' general recording operation, said sensor outputs into a displacement amount according to said calibrated displacement-output curve, with the height of the face-to-be-detected at completion of the relative height adjustment as the reference;

calculating a difference between respective ones of said displacement amounts of said faces-to-be-detected as time dependent deviation of the relative height of said pair of magnetic heads; and correcting said optimum offset signal applied to at least one of said pair of actuators according to said calculated difference.

6. The method according to claim 5, wherein said step of detecting and storing said sensor outputs required for calibrating said displacement-output curve of said sensor includes for each of said pair of magnetic heads the steps of:

controlling the travel of said magnetic tape so that said signals are equally reproduced from two adjacent tracks with the unrecorded space therebetween by the magnetic head; and displacing the magnetic head for detecting and storing an output of said sensor when said magnetic head equally reproduces said signals from two adjacent tracks with the unrecorded space therebetween or when a reproduced output of said magnetic head becomes maximum.

7. The method according to claim 3, further including the steps of:

providing a plurality of faces-to-be-detected with predetermined distance in height from each other at each of said pair of magnetic heads;

providing at least one sensor for detecting the height of said plurality of faces-to-be-detected of each of said pair of magnetic heads;

storing outputs of said sensor for respective ones of said plurality of faces-to-be-detected at completion of the step of adjusting the relative height between said pair of magnetic heads, for each of said magnetic heads;

calibrating a displacement-output curve of said sensor for one of said faces-to-be-detected according to the stored sensor outputs, with the height of said one of said faces-to-be-detected at completion of the relative height adjustment as the reference, for each magnetic head;

converting, during the apparatus' general recording operation, said sensor output for said one of said faces-to-be-detected into a displacement amount according to said calibrated displacement-output curve, with the height of said one of said faces-to-be-detected at completion of the relative height adjustment as the reference, for each magnetic head;

calculating difference between respective ones of said displacement amounts for the pair of magnetic heads as time dependent deviation of the relative height of said pair of magnetic heads; and correcting said optimum offset signal applied to at least one of said pair of actuators according to said calculated difference.

8. The method according to claim 3, further including the steps of:

providing faces-to-be-detected at respective ones of said pair of magnetic heads;

providing at least one sensor for detecting the height of said faces-to-be-detected;

providing a first reference face provided on a bottom of said rotary drum;

providing at least one second reference face on the bottom of said rotary drum with a predetermined distance in height from said first reference face;

detecting outputs of said at least one sensor with respect to said first and second reference faces;

calibrating a distance-output curve of said sensor according to said detected sensor outputs, with the height of said first reference face as the reference;

converting said sensor outputs for respective ones of said faces-to-be-detected into distances from said first reference face according to said calibrated distance-output curve, and calculating a difference in distance between pairs of faces-to-be-detected;

storing said difference in distance at completion of the step of adjusting the relative height between said pair of magnetic heads; and controlling said pair of actuators during the apparatus' general recording operation so that said difference in distance detected during the apparatus' general signal recording operation matches a corresponding difference in distance at completion of said adjusting step.

9. In a rotary head type magnetic recording and reproduction apparatus including a rotary drum, and two magnetic head groups each having n magnetic heads, n being an integer of at least 2; a method of adjusting the relative height between said two magnetic head groups, comprising the steps of:

setting the number of rotations of said rotary drum per time period during which a magnetic tape travels a unit length to k times the number of rotations per time period of the apparatus' general recording and reproducing operation, k being a divisor of n other than 1;

recording cyclically in a predetermined order a plurality of types of predetermined signals differing for respective tracks on said magnetic tape by at least one magnetic head in either one of said two magnetic head groups to form a plurality of tracks;

rewinding said magnetic tape after recording said signals;

reproducing said recorded signals and controlling the travel of said magnetic tape after said rewinding step so that said signals are simultaneously reproduced equally from two of said plurality of tracks by at least one magnetic head in a first one of said two magnetic head groups, the centers of the two tracks being spaced apart by two times the track pitch of the apparatus' general signal recording operation;

as the travel of said magnetic tape is controlled, detecting information concerning the relative height between said two magnetic head groups according to a difference in the output level of signals reproduced from two of said plurality of tracks by at least one magnetic head in a second one of said magnetic head groups, the centers of the two tracks being spaced apart by two times the track pitch of the apparatus' general signal recording operation, or according to an output level of said signals reproduced from the tracks scanned by said at least one magnetic head in the second magnetic head croup; and adjusting the relative height between said two magnetic head groups according to said detected information.

10. The method according to claim 9, wherein said apparatus includes a pair of actuators for displacing said magnetic head groups, respectively, in the track width direction, and said step of adjusting the relative height includes the steps of:

obtaining from said information concerning relative height an optimum offset signal to be applied to at least one of said pair of actuators to compensate for said relative height, and storing said optimum offset signal; and applying, during the apparatus' general recording operation, said stored optimum offset signal to at least one of said pair of actuators for compensating for the relative height between said magnetic head groups.

11. The method according to claim 10, further including the steps of:

providing faces-to-be-detected at respective ones of said two magnetic head groups;

providing at least one sensor for detecting the height of said faces-to-be-detected;

storing outputs of said at least one sensor for respective ones of said faces-to-be-detected at completion of the step of adjusting the relative height between said two magnetic head groups; and controlling independently said pair of actuators during the apparatus' general signal recording operation so that outputs of said sensor detected for respective ones of said faces-to-be-detected coincide with said stored sensor outputs.

12. The method according to claim 10, further including the steps of:

providing faces-to-be-detected at respective ones of said two magnetic head groups;

providing at least one sensor for detecting a height of said faces-to-be-detected;

storing outputs of said at least one sensor for respective ones of said faces-to-be-detected at completion of the step of adjusting the relative height between said two magnetic head groups;

for respective ones of said faces-to-be-detected, storing outputs of said at least one sensor when the magnetic head group corresponding to the faces-to-be-detected is displaced by an integral multiple of a track pitch in the apparatus' general signal recording from the height at completing adjustment of the relative height;

for respective ones of said faces-to-be-detected, calibrating a displacement-output curve of said sensor according to the stored sensor outputs, with the height of the face-to-be-detected at completion of the relative height adjustment as the reference;

for respective ones of said faces-to-be-detected, converting, during the apparatus' general recording operation, said sensor outputs into a displacement amount according to said calibrated displacement-output curve, with the height of the faces-to-be-detected at completion of the relative height adjustment as the reference;

calculating difference between respective ones of said displacement amounts of said faces-to-be-detected as time dependent deviation of the relative height of said two magnetic head groups; and correcting said optimum offset signal applied to at least one of said pair of actuators according to said calculated difference.

13. The method according to claim 12, wherein said step of detecting and storing said sensor outputs required for calibrating said displacement-output curve of said sensor includes for each of said two magnetic head groups the steps of:

controlling the travel of said magnetic tape so that said signals are equally reproduced from two tracks by at least one magnetic head of the magnetic head group, the centers of the two tracks being spaced apart by two times the track pitch of the apparatus' general signal recording operation; and displacing said magnetic head group for detecting and storing an output of said sensor when at least one magnetic head of said magnetic head group equally reproduces said signals from two tracks, the centers of the two tracks being spaced apart by two times the track pitch of the apparatus' general signal recording operation or when a reproduced output of said at least one magnetic head of said magnetic head group becomes maximum.

14. The method according to claim 10, further including the steps of:

providing a plurality of faces-to-be-detected with predetermined distance in height from each other at each of said two magnetic head groups;

providing at least one sensor for detecting the height of said plurality of faces-to-be-detected of each of said two magnetic head groups;

storing outputs of said at least one sensor for respective ones of said plurality of faces-to-be-detected at completion of the step of adjusting the relative height between said two magnetic head groups, for each magnetic head group;

calibrating a displacement-output curve of said sensor for one of said faces-to-be-detected according to the stored sensor outputs, with the height of said one of said faces-to-be-detected at completion of the relative height adjustment as the reference, for each magnetic head group;

converting, during the apparatus' general recording operation, said sensor output for said one of said faces-to-be-detected into a displacement amount according to said calibrated displacement-output curve, with the height of said one of said faces-to-be-detected at completion of the relative height adjustment as the reference, for each magnetic head group;

calculating differences between respective ones of said displacement amounts for said two magnetic head groups as time dependent deviation of the relative height of said two magnetic head groups; and correcting said optimum offset signal applied to at least one of said pair of actuators according to said calculated difference.

15. The method according to claim 10, further including the steps of:

providing faces-to-be-detected at respective ones of said two magnetic head groups;

providing at least one sensor for detecting the height of said faces-to-be-detected;

providing a first reference face provided on a bottom of said rotary drum;

providing at least one second reference face on the bottom of said rotary drum with a predetermined distance in height from said first reference face;

detecting outputs of said at least one sensor with respect to said first and second reference faces;

calibrating a distance-output curve of said sensor according to said detected sensor outputs, with the height of said first reference face as the reference;

converting said sensor outputs for respective ones of said faces-to-be-detected into distances from said first reference face according to said calibrated distance-output curve, and calculating a difference in distance between pairs of faces-to-be-detected;

storing said difference in distance at completion of the step of adjusting the relative height between said two magnetic head groups; and controlling said pair of actuators during the apparatus' general recording operations so that said difference in distance detected during the apparatus' general signal recording operation matches a corresponding difference in distance at completion of said adjustment step.

16. The method, according to claim 9, wherein said step of detecting information concerning the relative height relies on the difference in the output level of said signals reproduced from two of said plurality of tracks by said at least one magnetic head in said second magnetic head group, and includes the step of detecting as said information concerning the relative height an offset signal applied to a displacement actuator corresponding to said second magnetic head group when the difference in the output level reproduced from said two tracks is zero.

17. The method according to claim 9, wherein said step of detecting information concerning the relative height relies on the output level of said signals reproduced by said at least one magnetic head in said second magnetic head group, and includes the step of detecting as said information concerning the relative height an offset signal applied to a displacement actuator corresponding to said second magnetic head group when the output level reproduced from the tracks scanned by the magnetic head in the second magnetic head group becomes maximum.

18. The method according to claim 9, wherein said setting step includes setting the number of rotations per unit time of said rotary drum to k times the number of rotations per unit time of the apparatus' general recording and reproducing operation.

19. The method according to claim 9, wherein said setting step includes setting the traveling speed of the magnetic tape to 1/k times the traveling speed of the apparatus' general recording and reproducing operation.

20. The method according to claim 9, wherein said recording step produces an unrecorded space between adjacent tracks, the unrecorded space spanning the length of the adjacent tracks, and further wherein said detecting step uses a magnetic head which scans recorded tracks such that said information concerning the relative height between said two magnetic groups is detected according to the output level of said signals reproduced from the tracks scanned by said magnetic head.

21. The method according to claim 9, wherein said recording step produces an unrecorded space between adjacent tracks, the unrecorded space spanning the length of the adjacent tracks, and further wherein said detecting step uses a magnetic head which scans the unrecorded spaces such that said information concerning the relative height between said two magnetic head groups is detected according to the difference in the output level of the signals reproduced from the two adjacent tracks surrounding the scanned unrecorded spaces.

22. A rotary head type magnetic recording and reproduction apparatus that can have the relative height between a pair of magnetic heads adjusted, comprising:

a rotary drum;

a pair of magnetic heads;

actuators provided on said rotary drum for displacing in the track width direction said pair of magnetic heads, respectively;

means for recording cyclically in a predetermined order a plurality of types of predetermined signals differing for respective tracks on a traveling magnetic tape by a first one of said magnetic heads to form a plurality of tracks, adjacent tracks having an unrecorded space therebetween, the unrecorded space spanning the length of the adjacent tracks;

means for rewinding said magnetic tape after recording said signals;

means for reproducing the recorded signals and controlling the travel of said magnetic tape so that said signals are simultaneously reproduced equally from two adjacent tracks out of said plurality of tracks by a second one of said magnetic heads, the unrecorded space being present between the two adjacent tracks;

means for detecting an output level of said signal reproduced by said first magnetic head while sequentially applying a plurality of predetermined offset signals to an actuator which changes a relative height between said first and second magnetic heads as the travel of said magnetic tape is controlled;

means for detecting an offset signal being applied to said actuator when an output level of said signals reproduced by said first magnetic head becomes maximum as information concerning the relative height between said pair of magnetic heads;

means for obtaining from said offset signal detected as said information concerning the relative height an optimum offset signal to be applied to at least one of actuators to adjust said relative height and storing said optimum offset signal; and means for applying said stored optimum offset signal to at least one of said [pair of] actuators during the apparatus general signal recording operation to adjust the relative height between said magnetic heads.

23. The rotary head type magnetic recording and reproduction apparatus according to claim 22, further comprising:

faces-to-be-detected provided at respective ones of said pair of magnetic heads;

at least one sensor for detecting the height of said faces-to-be-detected;

means for storing outputs of said at least one sensor for respective ones of said faces-to-be-detected at the time when the relative height between said pair of magnetic heads is adjusted by said relative height adjustment means; and means for controlling independently said pair of actuators during the apparatus' general signal recording operation so that outputs of said sensor detected for respective ones of said faces-to-be-detected coincide with said stored sensor outputs.

24. The rotary head magnetic recording and reproduction apparatus according to claim 22, further comprising:

faces-to-be-detected provided at respective ones of said pair of magnetic heads;

at least one sensor for detecting a height of said faces-to-be-detected;

means for storing outputs of said at least one sensor for respective ones of said faces-to-be-detected at the time when the relative height between said pair of magnetic heads is adjusted by said relative height adjustment means;

for respective ones of said faces-to-be-detected, means for storing outputs of said sensor when the magnetic head corresponding to the face-to-be-detected is displaced by an integral multiple of a track pitch in the apparatus' general signal recording from the state of completing adjustment of the relative height;

for respective ones of said faces-to-be-detected, means for calibrating a displacement-output curve of said sensor according to the stored sensor outputs, with the height of the face-to-be-detected at completion of the relative height adjustment as the reference;

for respective ones of said faces-to-be-detected, means for converting, during the apparatus' general recording operation, said sensor outputs into a displacement amount according to said calibrated displacement-output curve, with the height of the faces-to-be-detected at completion of the relative height adjustment as the reference;

means for calculating differences between respective ones of said displacement amounts of said faces-to-be-detected as time dependent deviation of the relative height of said pair of magnetic heads; and means for correcting said optimum offset signal applied to at least one of said pair of actuators according to said calculated difference.

25. The rotary head type magnetic recording and reproduction apparatus according to claim 24, wherein said means for detecting and storing said sensor outputs required for calibrating said displacement-output curve of said sensor includes for each of said pair of magnetic heads:

means for controlling the travel of said magnetic tape so that said signals are equally reproduced from two adjacent tracks with the unrecorded space therebetween by said magnetic head; and means for displacing said magnetic head for detecting and storing an output of said sensor when said magnetic head equally reproduces said signal from two adjacent tracks with the unrecorded space therebetween or when a reproduced output of said magnetic head becomes maximum.

26. The rotary head type magnetic recording and reproduction apparatus according to claim 22, further comprising:

a plurality of faces-to-be-detected with predetermined distance in height from each other provided on each of said pair of magnetic heads;

at least one sensor for detecting the height of said plurality of faces-to-be-detected of each of said pair of magnetic heads;

means for storing outputs of said at least one sensor for respective ones of said plurality of faces-to-be-detected at the time when the relative height between said pair of magnetic heads is adjusted by said relative height adjustment means, for each magnetic head;

means for calibrating a displacement-output curve of said sensor for one of said faces-to-be-detected according to the stored sensor outputs, with the height of said one of said faces-to-be-detected at completion of the relative height adjustment as the reference, for each magnetic head;

means for converting, during the apparatus' general recording operation, said sensor output for said one of faces-to-be-detected into a displacement amount according to said calibrated displacement-output curve, with the height of said one of said faces-to-be-detected at completion of the relative height adjustment as the reference, for each magnetic head;

means for calculating difference between respective ones of said displacement amounts for the pair of magnetic heads as time dependent deviation of relative height of said pair of magnetic heads; and means for correcting said optimum offset signal applied to at least one of said pair of actuators according to said calculated difference.

27. The rotary head type magnetic recording and reproduction apparatus according to claim 22, further comprising:

faces-to-be-detected provided at respective ones of said pair of magnetic heads;

at least one sensor for detecting the height of said faces-to-be-detected;

a first reference face provided on a bottom of said rotary drum;

at least one second reference face provided on the bottom of said rotary drum with a predetermined distance in height from said first reference face;

means for detecting outputs of said sensor with respect to said first and second reference face;

means for calibrating a distance-output curve of said sensor according to said detected sensor outputs, with the height of said first reference face as the reference;

means for converting sensor outputs for respective ones of said faces-to-be-detected into distances from said first reference face according to said calibrated distance-output curve, and calculating a difference in distance between pairs of faces-to-be-detected;

means for storing said difference in said distance at completion of adjustment of the relative height between said pair of magnetic heads by said relative height adjustment means; and means for controlling said pair of actuators during the apparatus' general recording operation so that said difference in distance detected during the apparatus' general signal recording operation matches a corresponding difference in distance at completion of the relative height adjustment.

28. A rotary head type magnetic recording and reproduction apparatus that can have the relative height between two magnetic head groups adjusted, comprising:

a rotary drum;

two magnetic head groups each including n magnetic heads, n being an integer of at least 2;

actuators provided on said rotary drum for displacing in the track width direction said two magnetic head groups;

setting means for setting the number of rotations of said rotary drum per time period during which a magnetic tape travels a unit length to k times the number of rotations per time period of the apparatus' general recording and reproducing operation, k being a divisor of n other than 1;

means for recording cyclically in a predetermined order a plurality of types of predetermined signals differing for each track on a magnetic tape by at least one magnetic head in either one of said two magnetic head groups to form a plurality of tracks;

means for rewinding said magnetic tape after recording said signals;

means for reproducing said recorded signals and controlling the travel of said magnetic tape so that said signals are simultaneously reproduced equally from two of said plurality of tracks by at least one magnetic head in a first one of said two magnetic head groups, the centers of the two tracks being spaced apart by two times the track pitch of the apparatus general signal recording operation;

in a height adjustment mode in which the travel of said magnetic tape is controlled, means for detecting as information concerning the relative height between said two magnetic head groups an offset signal applied to an actuator for displacing the second magnetic head group when the difference in the output level reproduced from two tracks out of said plurality of tracks, the centers of the two tracks being spaced apart by two times the track pitch of the apparatus' general signal recording operation, by at least one magnetic head in the second magnetic head group becomes zero or when the output level of said signal reproduced from a track scanned by said magnetic head becomes maximum;

means for obtaining from said offset signal detected as said information concerning the relative height an optimum offset signal to be applied to at least one of said actuators for adjusting said relative height, and storing said optimum offset signal; and means for applying said stored optimum offset signal to at least one of said actuators to adjust the relative. height between said magnetic head groups during the apparatus' general signal recording operation.

29. The rotary head type magnetic recording and reproduction apparatus according to claim 28, further comprising:

faces-to-be-detected provided at respective ones of said two magnetic head groups; at least one sensor for detecting the height of said faces-to-be-detected;

means for storing outputs of said sensor for respective ones of said faces-to-be-detected at the time when the relative height between said two magnetic head groups is adjusted by said relative height adjustment means; and means for controlling at least one of said actuators during the apparatus' general signal recording operation so that outputs of said sensor detected for respective ones of said faces-to-be-detected coincide with said stored sensor outputs.

30. The rotary head type magnetic recording and reproduction apparatus according to claim 28, further comprising:

faces-to-be-detected provided at respective ones of said two magnetic head groups;

at least one sensor for detecting a height of said faces-to-be-detected;

means for storing output of said sensor for respective ones of said faces-to-be-detected at the time when the relative height between said two magnetic head groups is adjusted by said relative height adjustment means;

for respective ones of said faces-to-be-detected, means for storing outputs of said sensor when the magnetic head group corresponding to the face-to-be-detected is displaced by an integral multiple of a track pitch in the apparatus' general signal recording from the height at completing adjustment of the relative height;

for respective ones of said faces-to-be-detected, means for calibrating a displacement-output curve of said sensor according to the stored sensor outputs, with the height of the faces-to-be-detected at completion of the relative height adjustment as the reference;

for respective ones of said faces-to-be-detected, means for converting, during the apparatus' general recording operation, said sensor output into a displacement amount according to said calibrated displacement-output curve, with the height of the face-to-be-detected at completion of the relative height adjustment as the reference;

means for calculating difference between respective ones of said displacement amounts of said faces-to-be-detected as time dependent deviation of the relative height of said two magnetic head groups; and means for correcting said optimum offset signal applied to at least one of said actuators according to said calculated difference.

31. The rotary head type magnetic recording and reproduction apparatus according to claim 30, wherein said means detecting and storing said sensor output required for calibrating said displacement-output curve of said sensor includes, for each of said two magnetic head groups:

means for controlling the travel of said magnetic tape so that said signals are reproduced equally from two tracks by at least one magnetic head in the magnetic head group, the centers of the two tracks being spaced apart by two times the track pitch of the apparatus' general signal recording operation;

means for displacing said magnetic head group for detecting and storing an output of said sensor when at least one magnetic head of said magnetic head group equally reproduces said signals from two tracks, the centers of the two tracks being spaced apart by two times the track pitch in the apparatus' general signal recording operation or when a reproduced output of said at least one magnetic head of said magnetic head group becomes maximum.

32. The rotary head type magnetic recording and reproduction apparatus according to claim 28, further comprising:

a plurality of faces-to-be-detected with predetermined distance in height from each other provided at each of said two magnetic head groups;

at least one sensor for detecting the height of said plurality of faces-to-be-detected of each of said two magnetic head groups;

means for storing outputs of said sensor for respective ones of said plurality of faces-to-be-detected at the time when the relative height between said two magnetic head groups is adjusted by said relative height adjustment means, for each magnetic head group;

means for calibrating a displacement-output curve of said sensor for one of said faces-to-be-detected according to the stored sensor outputs, with the height of said one of said faces-to-be-detected at completion of the relative height adjustment as the reference, for each magnetic head group;

for each magnetic head group, means for converting, during the apparatus' general recording operation, said sensor output for said one of said faces-to-be-detected into a displacement amount according to said calibrated displacement-output curve, with the height of said one of said faces-to-be-detected at completion of the relative height adjustment as the reference;

means for calculating difference between respective ones of said displacement amounts for said two magnetic head groups as time dependent deviation of the relative height of said two magnetic head groups; and means for correcting said optimum offset signal applied to at least one of said actuators according to said calculated difference.

33. The rotary head type magnetic recording and reproduction apparatus according to claim 28, further comprising:

faces-to-be-detected provided at respective ones of said two magnetic head groups;

at least one sensor for detecting the height of said faces-to-be-detected;

a first reference face provided on a bottom of said rotary drum;

at least one second reference face provided on the bottom of said rotary drum with a predetermined distance in height from said first reference face;

means for detecting outputs of said sensor with respect to said first and second reference faces;

means for calibrating a distance-output curve of said sensor according to said detected sensor outputs, with the height of said first reference face as the reference;

means for converting said sensor outputs for respective ones of said faces-to-be-detected into distances from said first reference face according to said calibrated distance-output curve, and calculating a difference in distance between pairs of faces-to-be-detected;

means for storing said difference in distance at the time when the relative height of said two magnetic head groups is adjusted by said relative height adjustment means; and means for controlling said actuators during the apparatus' general recording operation so that said difference in distance detected during the apparatus' general signal recording operation matches a corresponding difference in distance at completion of the relative height adjust by said adjustment means.

34. The rotary head type magnetic recording and reproducing apparatus according to claim 28, wherein said setting means sets the number of rotations per unit time of said rotary drum to k times the number of rotations per unit time of the apparatus' general recording and reproducing operation.

35. The rotary head type magnetic recording and reproducing apparatus according to claim 28, wherein said setting means sets the traveling speed of the magnetic tape to 1/k times the traveling speed of the apparatus' general recording and reproducing operation.

* * * * *